US012639711B2

(12) United States Patent
Mori

(10) Patent No.: US 12,639,711 B2
(45) Date of Patent: May 26, 2026

(54) TRANSACTION PROCESSING DEVICE, TRANSACTION PROCESSING METHOD, AND PROGRAM RECORDING MEDIUM

(71) Applicant: Toshiba Tec Kabushiki Kaisha, Tokyo (JP)

(72) Inventor: Haruki Mori, Mishima Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 18/973,784

(22) Filed: Dec. 9, 2024

(65) Prior Publication Data

US 2025/0104068 A1    Mar. 27, 2025

Related U.S. Application Data

(63) Continuation of application No. 17/966,635, filed on Oct. 14, 2022, now abandoned, which is a
(Continued)

(30) Foreign Application Priority Data

Sep. 4, 2020    (JP) ................................. 2020-149085

(51) Int. Cl.
| | |
|---|---|
| *G06Q 20/40* | (2012.01) |
| *G06Q 20/18* | (2012.01) |
| *G06Q 20/32* | (2012.01) |

(52) U.S. Cl.
CPC ....... *G06Q 20/401* (2013.01); *G06Q 20/3276* (2013.01); *G06Q 20/18* (2013.01)

(58) Field of Classification Search
CPC ... G06Q 20/401; G06Q 20/3276; G06Q 20/18
See application file for complete search history.

(56) References Cited

U.S. PATENT DOCUMENTS

| | | | |
|---|---|---|---|
| 9,619,976 | B2 | 4/2017 | Sambe |
| 10,032,154 | B2 | 7/2018 | Sambe |

(Continued)

FOREIGN PATENT DOCUMENTS

| | | | | | |
|---|---|---|---|---|---|
| CN | 106779690 | A | * | 5/2017 | ............. G06Q 20/20 |
| CN | 111401918 | A | | 7/2020 | |

(Continued)

OTHER PUBLICATIONS

R. Angeline, T. Gaurav, P. Rampuriya and S. Dey, "Supermarket Automation with Chatbot and Face Recognition Using IoT and AI," 2018 3rd International Conference on Communication and Electronics Systems (ICCES), Coimbatore, India, 2018, pp. 1183-1186.*

(Continued)

*Primary Examiner* — Steven S Kim
(74) *Attorney, Agent, or Firm* — Kim & Stewart LLP

(57) ABSTRACT

A transaction processing device of an embodiment includes a first registration unit, a linkage unit, and a second registration unit. The first registration unit stores a content of a transaction related to a user in response to a request from a first terminal made by an operation of the user. The linkage unit links the process of storing the content of the transaction related to the user performed by the first registration unit to a second terminal. When the content of the transaction related to the user is sent from the second terminal, the second registration unit stores the content of the transaction sent from the second terminal as the content of the transaction related to the user in the first registration unit by using the association.

7 Claims, 17 Drawing Sheets

Related U.S. Application Data continuation of application No. PCT/JP2021/032466, filed on Sep. 3, 2021.

(56)            References Cited

U.S. PATENT DOCUMENTS

| | | | |
|---|---|---|---|
| 10,482,448 B2 | 11/2019 | Sambe | |
| 10,878,669 B2 | 12/2020 | Ugajin | |
| 11,257,060 B2 | 2/2022 | Sambe | |
| 12,062,034 B2 * | 8/2024 | Kieffer | G06Q 20/3274 |
| 2005/0027543 A1 | 2/2005 | Labrou et al. | |
| 2007/0022058 A1 | 1/2007 | Labrou et al. | |
| 2012/0253913 A1 * | 10/2012 | Richard | G06Q 20/3278 |
| | | | 705/14.27 |
| 2013/0218721 A1 | 8/2013 | Borhan et al. | |
| 2013/0282533 A1 | 10/2013 | Foran-Owens et al. | |
| 2014/0214564 A1 | 7/2014 | Argue et al. | |
| 2014/0263631 A1 | 9/2014 | Muniz | |
| 2016/0292677 A1 | 10/2016 | Karlsson | |
| 2017/0200152 A1 * | 7/2017 | Winkler | G06Q 20/321 |
| 2019/0228461 A1 * | 7/2019 | Domokos | G06Q 30/0201 |
| 2020/0202684 A1 | 6/2020 | Ugajin | |
| 2020/0234262 A1 | 7/2020 | Mori | |
| 2020/0258113 A1 | 8/2020 | Nakatsukasa et al. | |
| 2020/0302417 A1 * | 9/2020 | Wyper | G06Q 30/04 |
| 2021/0174417 A1 * | 6/2021 | Kawamoto | G06Q 20/20 |
| 2021/0241259 A1 * | 8/2021 | Kawamoto | G06Q 30/0607 |
| 2022/0138718 A1 | 5/2022 | Sambe | |
| 2023/0206274 A1 * | 6/2023 | Lindered | G06Q 30/0238 |
| | | | 705/14.38 |
| 2024/0265367 A1 * | 8/2024 | Nummela | G06Q 20/20 |

FOREIGN PATENT DOCUMENTS

| | | | | |
|---|---|---|---|---|
| CN | 111462425 | A | 7/2020 | |
| EP | 3675071 | A1 | 7/2020 | |
| JP | 2011-108010 | A | 6/2011 | |
| JP | 2019-046244 | A | 3/2019 | |
| JP | 2019-125332 | A | 7/2019 | |
| JP | 2019-149176 | A | 9/2019 | |
| JP | 2020-102158 | A | 7/2020 | |
| JP | 2020-129342 | A | 8/2020 | |
| JP | 2020119064 | A | 8/2020 | |
| JP | 2021-089572 | A | 6/2021 | |
| WO | WO-2019033635 | A1 * | 2/2019 | G06F 18/00 |

OTHER PUBLICATIONS

First Office Action mailed Feb. 15, 2025 in corresponding Chinese Patent Application No. 202180029265.2, with English machine translation, 24 pages.

Notice of Reasons for Refusal (Office Action) mailed Feb. 25, 2025 in corresponding Japanese Patent Application No. 2022-546984 with English machine translation, 8 pages.

Extended European Search Report mailed Jun. 11, 2024 in corresponding European Patent Application No. 21864435.9, 9 pages.

English Translation of International Preliminary Report on Patentability (Chapter I) and Written Opinion mailed Mar. 16, 2023 in International Application No. PCT/JP2021/032466, 7 pages.

* cited by examiner

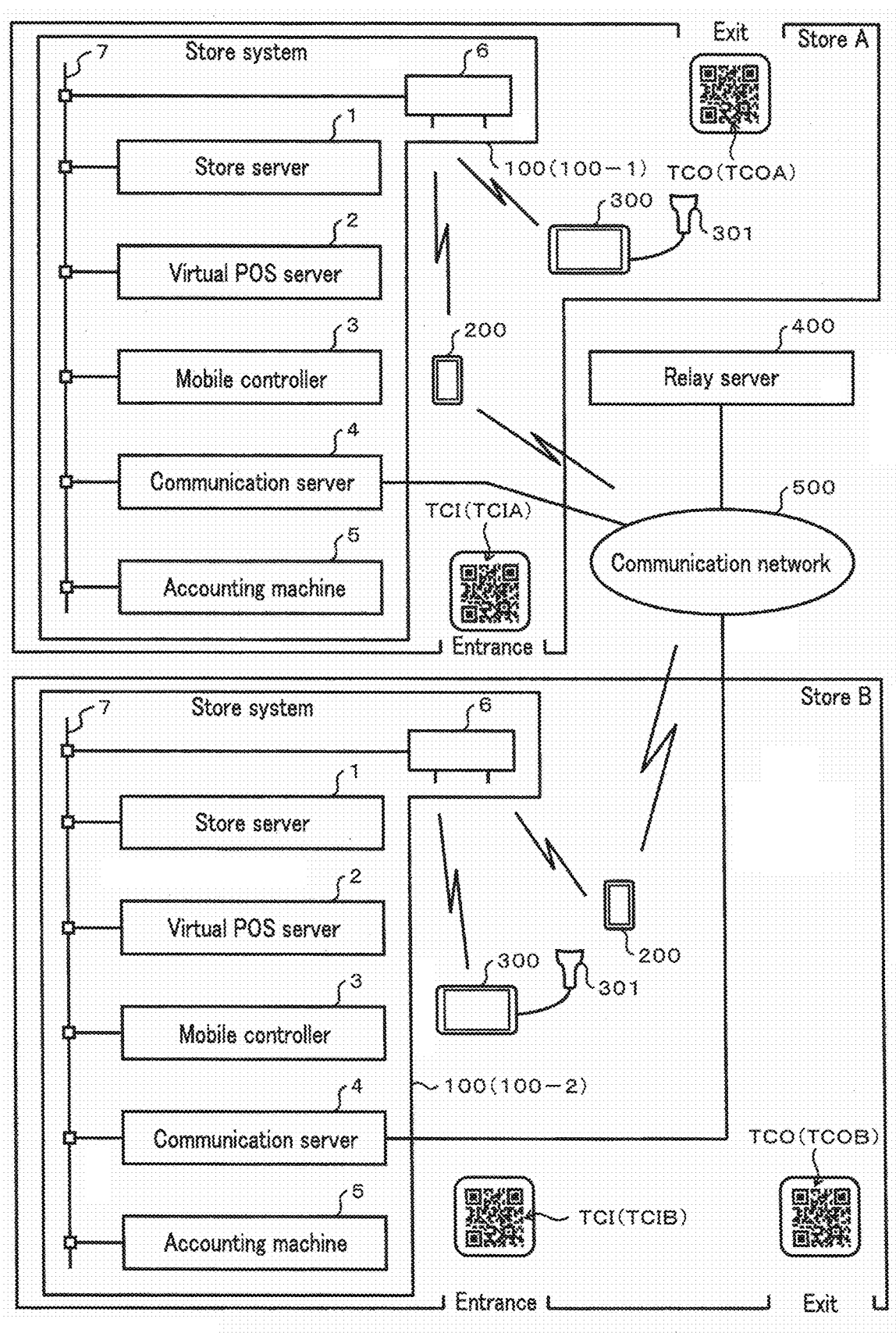
F I G. 1

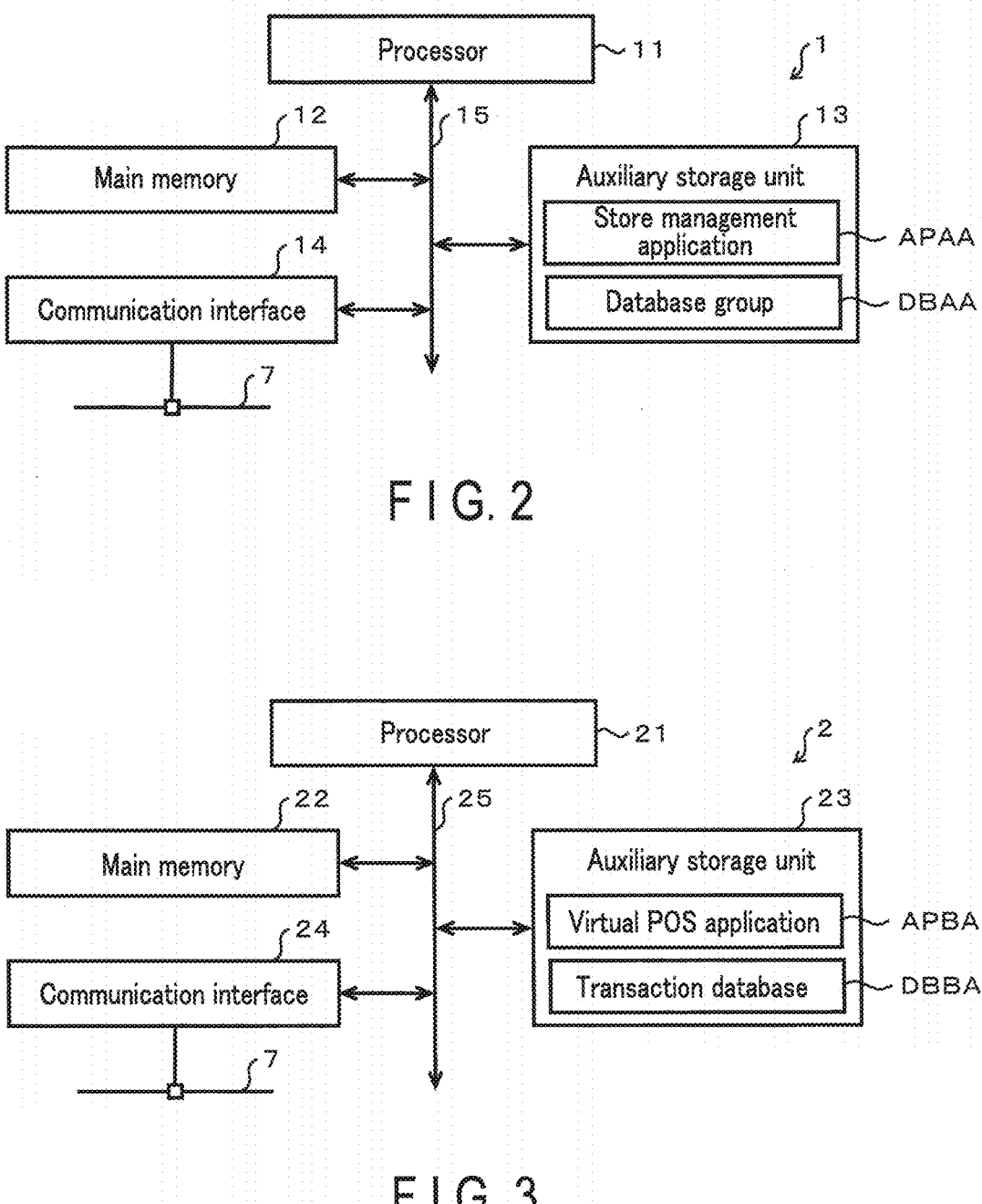
F I G. 2
F I G. 3

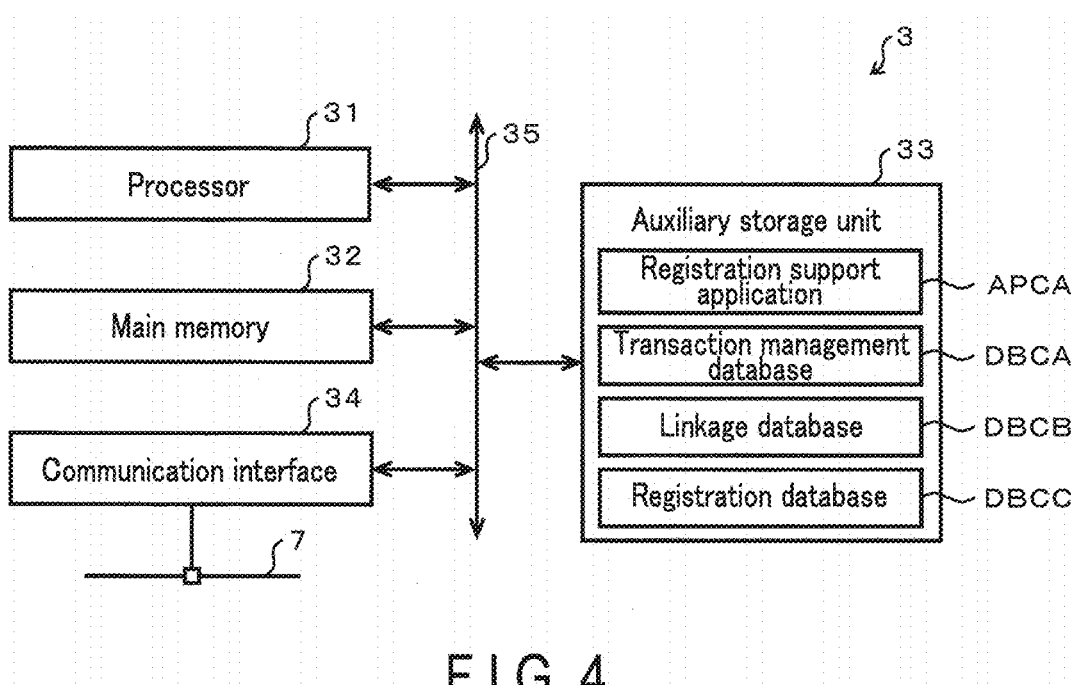
FIG. 4
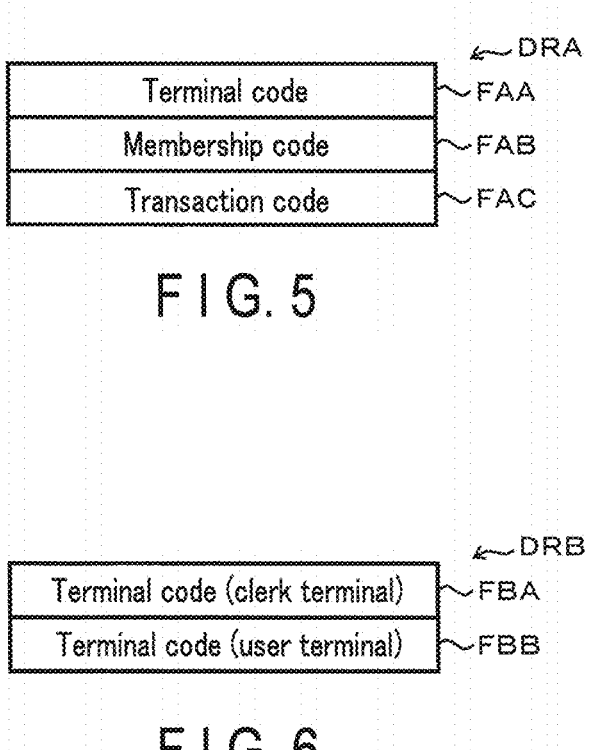
FIG. 5
FIG. 6

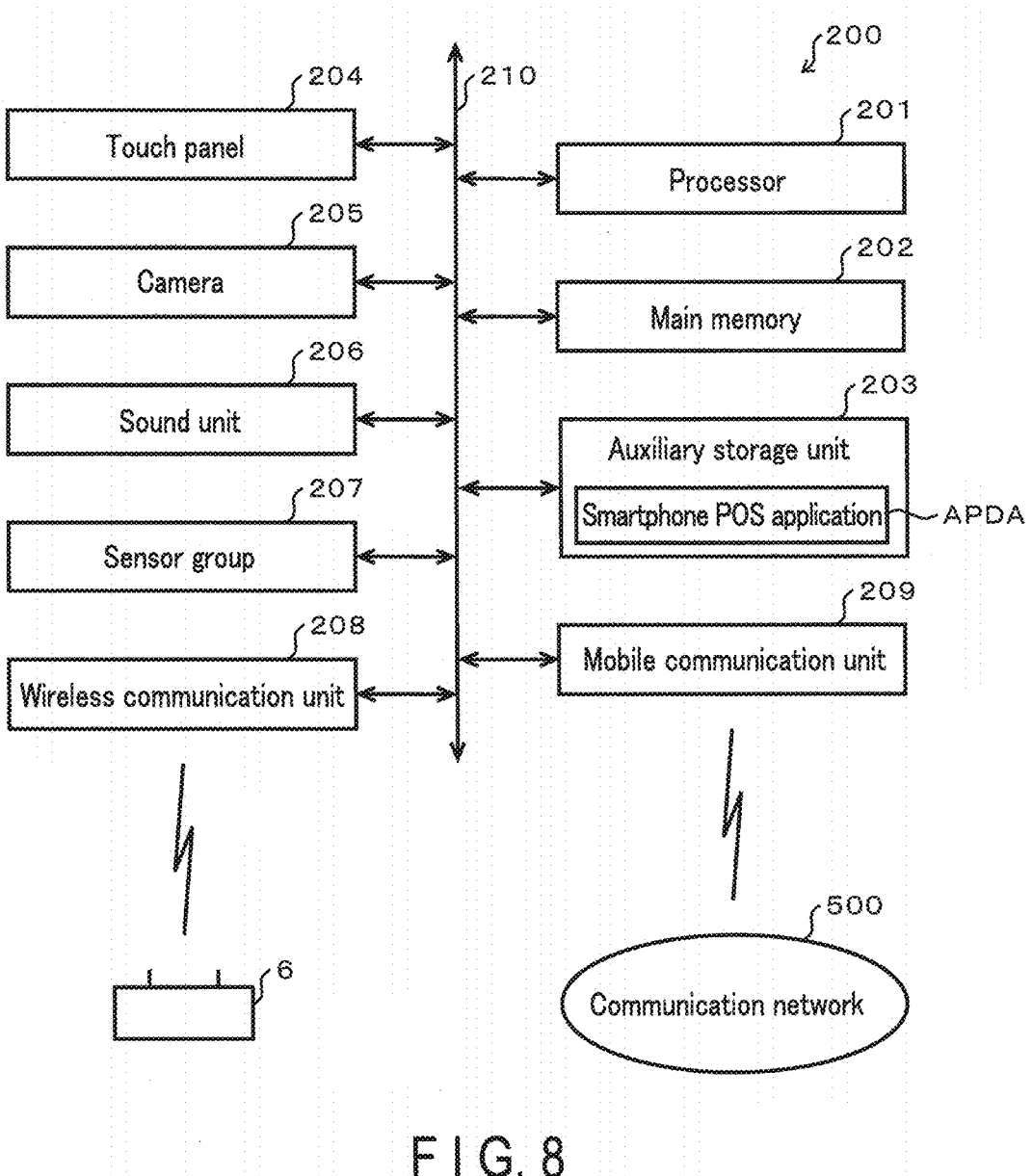
F I G. 8

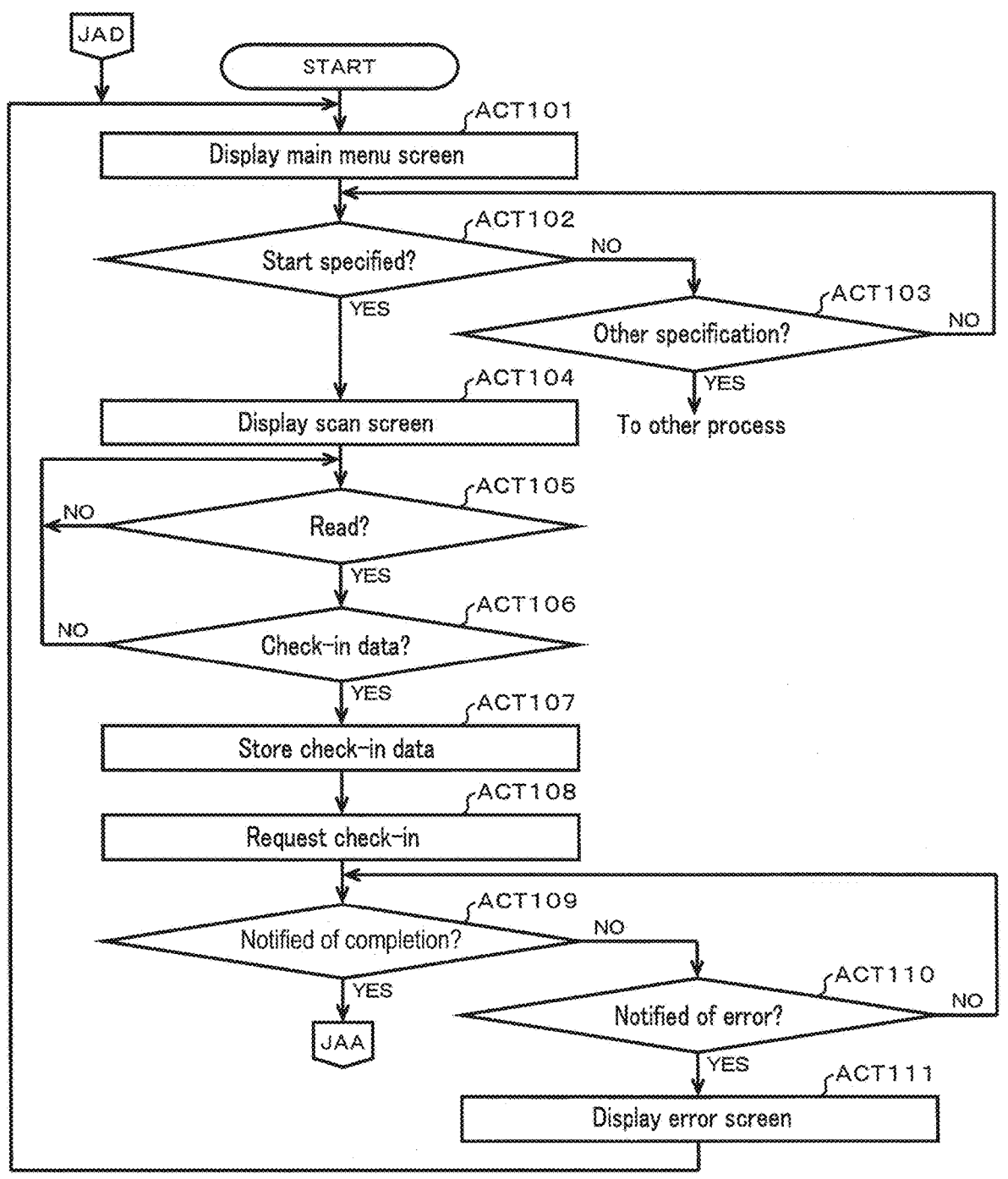
F I G. 10

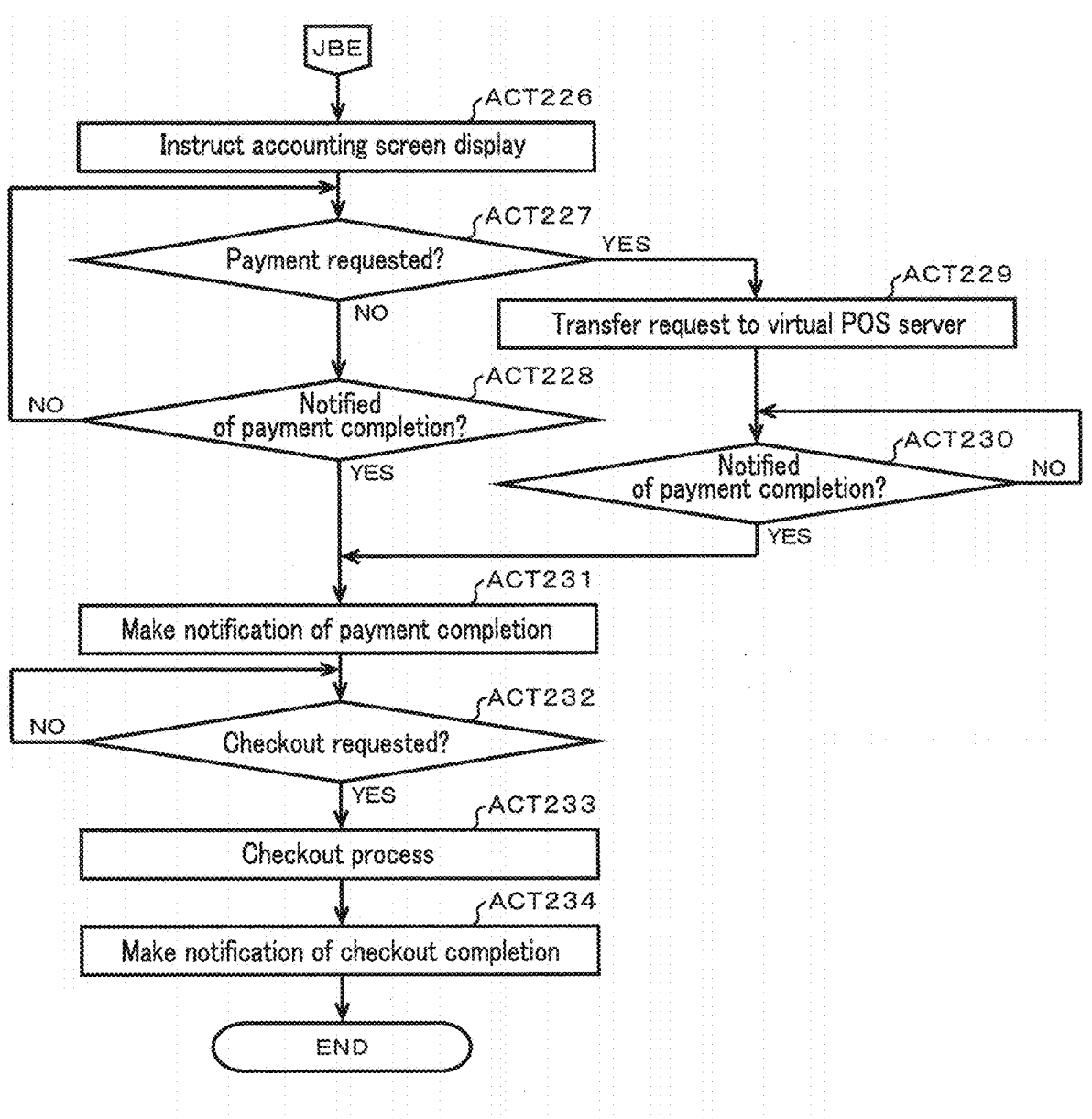
F I G. 16

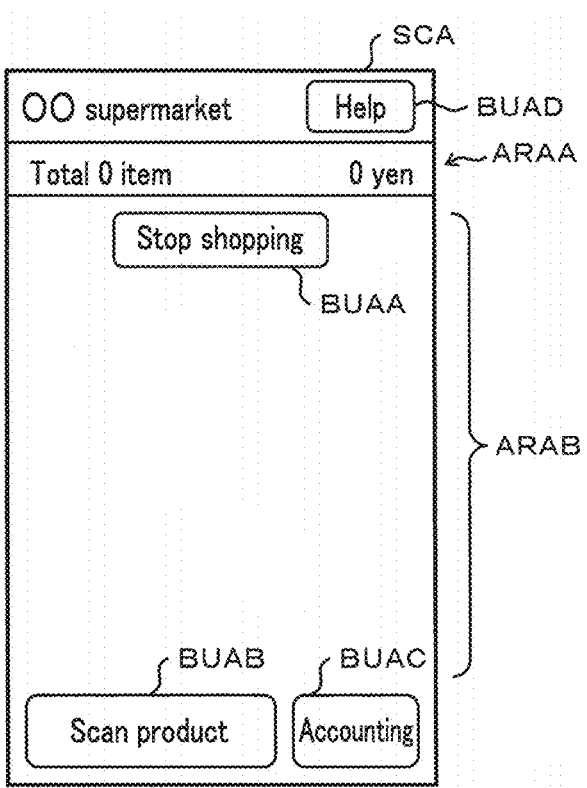
F I G. 17
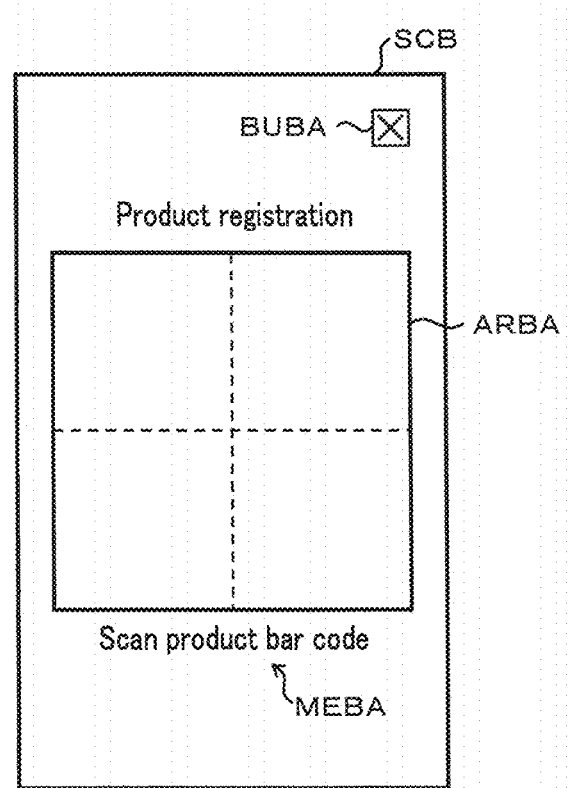
F I G. 18

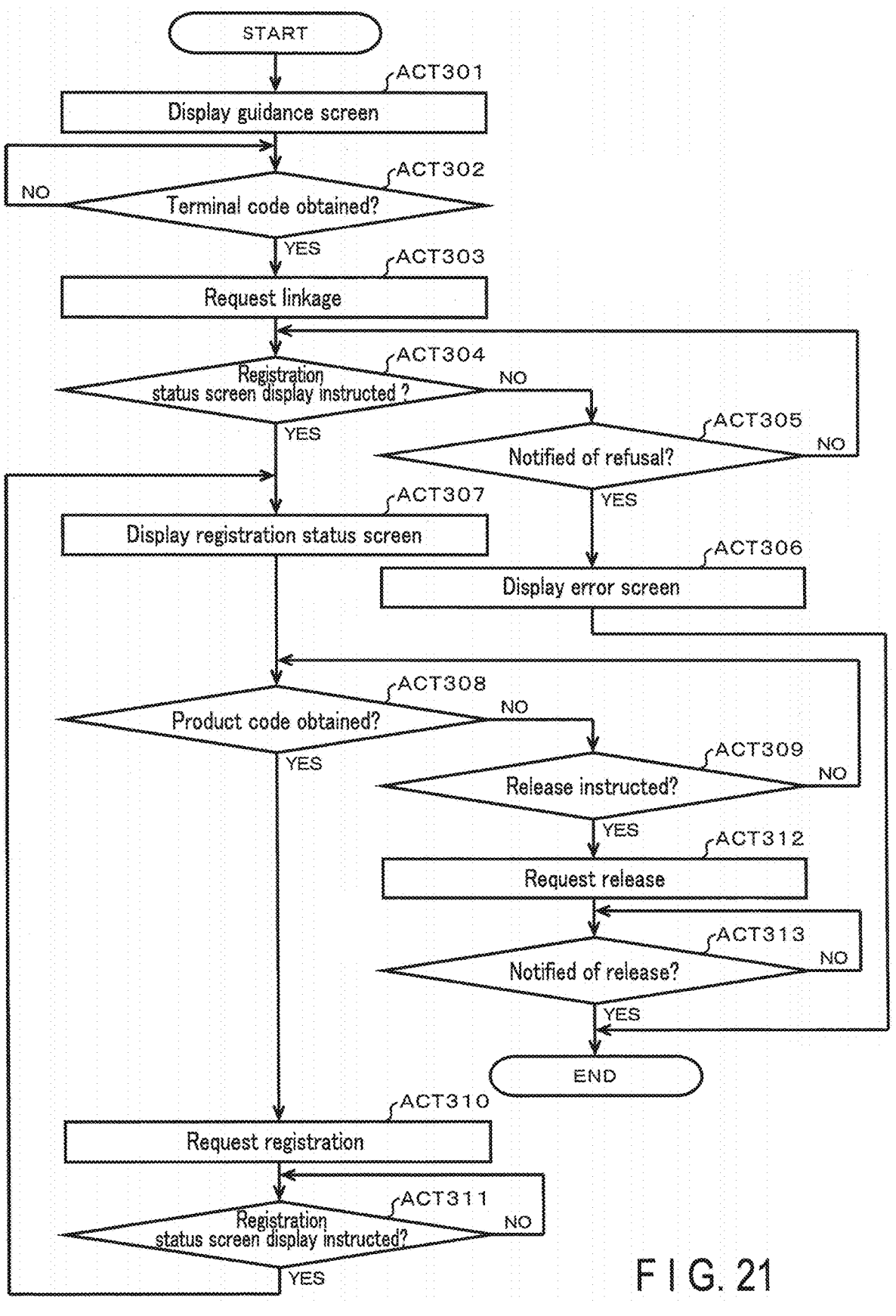
F I G. 21

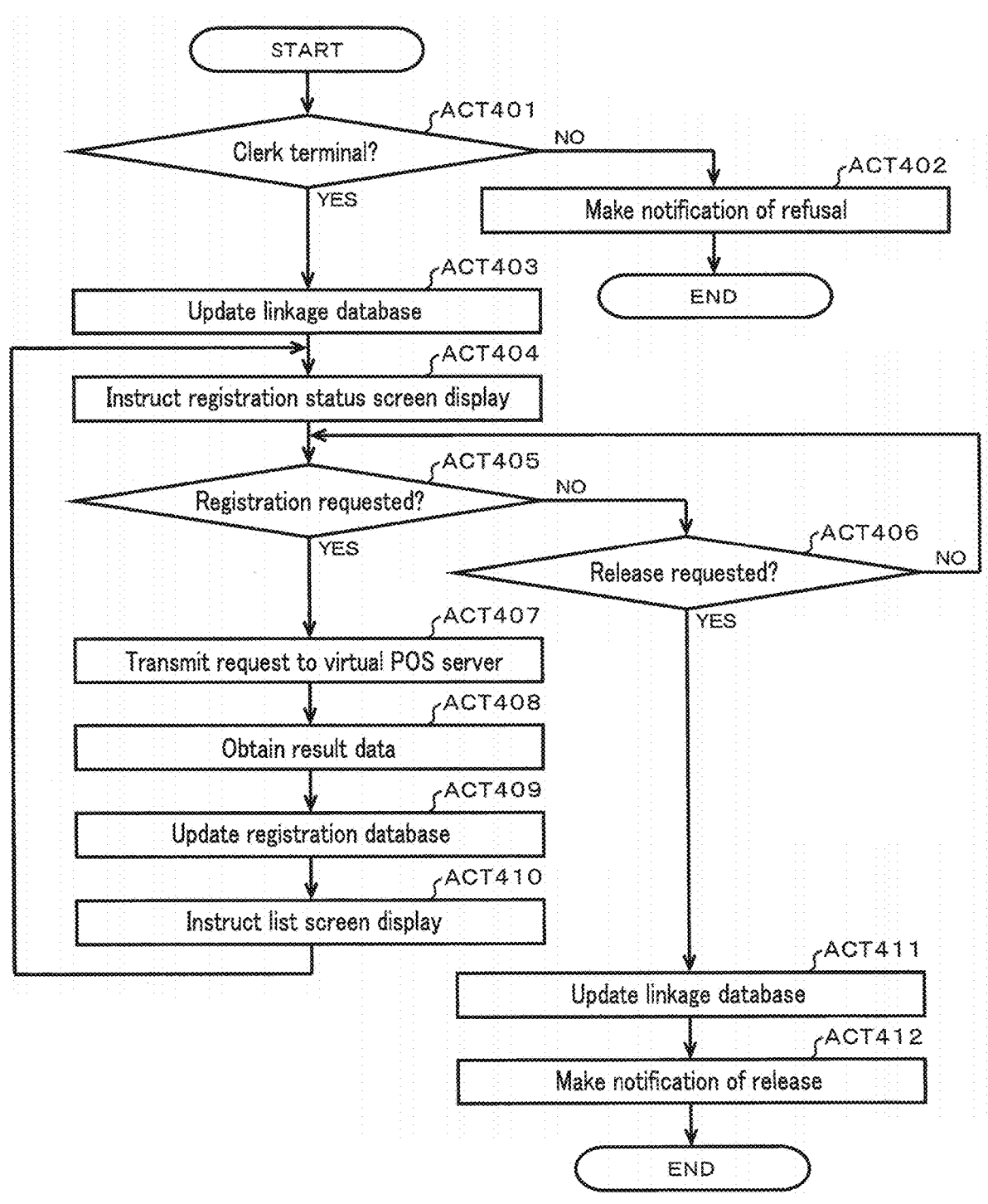
F I G. 22

TRANSACTION PROCESSING DEVICE, TRANSACTION PROCESSING METHOD, AND PROGRAM RECORDING MEDIUM

CROSS-REFERENCE TO RELATED APPLICATIONS

This application is a continuation application of U.S. patent application Ser. No. 17/966,635, filed Oct. 14, 2022, which is a continuation application of PCT Application No. PCT/JP2021/032466, filed Sep. 3, 2021 and based upon and claiming the benefit of priority from Japanese Patent Application No. 2020-149085, filed Sep. 4, 2020, the entire contents of all of which are incorporated herein by reference.

FIELD

Embodiments described herein relate generally to a transaction processing device, a transaction processing method, and a program recording medium.

BACKGROUND

A transaction processing system is known in which a purchased product is registered in response to an instruction from a customer on a terminal owned by the customer.

However, due to various reasons, such as difficulty in reading a bar code, a bar code not being displayed on a product, or a customer not knowing an operation method, it has sometimes been difficult for customers to register some products as purchased products.

Under these circumstances, it has been desired that a store clerk temporarily be able to perform operations related to registration of transaction contents of purchased products, etc.

BRIEF DESCRIPTION OF THE DRAWINGS

FIG. 1 is a block diagram showing a schematic configuration of a transaction processing system according to an embodiment.

FIG. 2 is a block diagram showing a main circuit configuration of a store server shown in FIG. 1.

FIG. 3 is a block diagram showing a main circuit configuration of a virtual POS server shown in FIG. 1.

FIG. 4 is a block diagram showing a main circuit configuration of a mobile controller shown in FIG. 1.

FIG. 5 is a schematic diagram showing a data structure of a data record included in a transaction management database shown in FIG. 4.

FIG. 6 is a schematic diagram showing a data structure of a data record included in a linkage database shown in FIG. 4.

FIG. 8 is a block diagram showing a main circuit configuration of a user terminal shown in FIG. 1.

FIG. 10 is a flowchart of information processing performed by a processor shown in FIG. 8.

FIG. 16 is a flowchart of transaction processing performed by the processor shown in FIG. 4.

FIG. 17 is a diagram showing an example of a list screen in a state where a purchased product is not registered.

FIG. 18 is a diagram showing an example of a registration screen.

FIG. 21 is a flowchart of information processing performed by a processor shown in FIG. 9.

FIG. 22 is a flowchart of linkage processing performed by the processor shown in FIG. 4.

DETAILED DESCRIPTION

Figure 7:
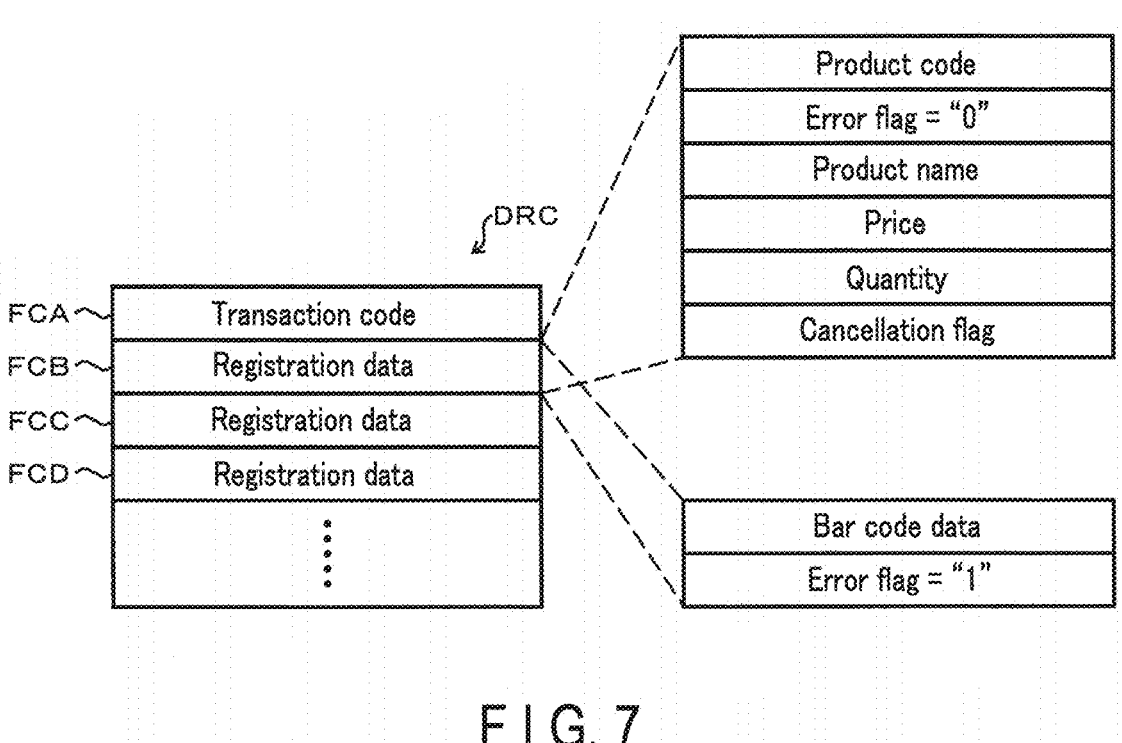
FIG. 7 is a schematic diagram showing a data structure of a data record included in a registration database shown in FIG. 4.

A transaction processing device of an embodiment includes a first registration unit, a linkage unit, and a second registration unit. The first registration unit performs a process of storing a content of a transaction related to a user in response to a request from a first terminal made by an operation of the user. By storing an association between the first terminal and a second terminal, the linkage unit links the process of storing the content of the transaction related to the user performed by the first registration unit to the second terminal. When the content of the transaction related to the user is sent from the second terminal, the second registration unit performs a process of storing the content of the transaction sent from the second terminal as the content of the transaction related to the user in the first registration unit by using the association between the second terminal and the first terminal.

Hereinafter, an embodiment of a transaction processing system will be described with reference to the drawings.

FIG. 1 is a block diagram showing a schematic configuration of a transaction processing system according to the present embodiment.

The transaction processing system includes a plurality of store systems 100, a user terminal 200, a clerk terminal 300, and a relay server 400. The plurality of store systems 100, the user terminal 200, and the relay server 400 can communicate with each other via a communication network 500. The clerk terminal 300 may also be able to communicate via the communication network 500.

FIG. 1 shows two store systems 100. These store systems 100 are installed in different stores A and B that use the transaction processing system, respectively. There may be three or more stores that use the transaction processing system, and a store system 100 is installed for each store. In the following, when it is necessary to distinguish the store system 100 installed in each store, the store system 100 installed in the store A is referred to as a store system 100-1, and the store system 100 installed in the store B is referred to as a store system 100-2.

A business operator that operates the store A may be the same as or different from a business operator that operates the store B. When the transaction system is used in other stores, a business operator who operates the store may be the same as or different from the business operator that operates the store A or the store B.

The user terminal 200 is an information processing device that functions as a user interface for customers who shop at a store by use of the transaction processing system. The user terminal 200 has a function of wirelessly communicating with the store system 100 and a function of wirelessly communicating with the communication network 500. As the user terminal 200, a communication terminal having a data communication function such as a smartphone or a tablet computer can be used. The user terminal 200 may be owned by a customer or lent to a customer at the store. The customer is the operator of the user terminal 200. However, the user terminal 200 may be operated by a store clerk, etc. on behalf of the customer. The user terminal 200 is an example of the first terminal. The customer is an example of a user of the first terminal.

The clerk terminal 300 is an information processing device that functions as a user interface for a store clerk. The clerk terminal 300 has a function of wirelessly communicating with the store system 100. As the clerk terminal 300, a communication terminal having a data communication function such as a tablet computer can be used. The clerk terminal 300 includes a bar code scanner 301. The bar code scanner 301 is a reading device suitable for optically reading a bar code representing a product code. The clerk terminal 300 is an example of the second terminal.

The relay server 400 relays data communication between the store system 100 and the user terminal 200. The relay server 400 provides, for example, a data communication relay function as a cloud service via the communication network 500.

As the communication network 500, for example, the Internet, a virtual private network (VPN), a local area network (LAN), a public communication network, a mobile communication network, etc. can be used alone or in combination as appropriate. As the communication network 500, a mobile communication network, and the Internet or VPN, are typically used.

A schematic configuration of each store system 100 is common. That is, the store system 100 is formed so that a store server 1, a virtual POS server 2, a mobile controller 3, a communication server 4, an accounting machine 5, and an access point 6 can communicate with each other via an in-store communication network 7. However, the store server 1, the virtual POS server 2, the mobile controller 3, the communication server 4, the accounting machine 5, the access point 6, and the in-store communication network 7 need only have the same functions for realizing operations to be described later, and do not have to be completely the same. Further, some store systems 100 may include devices not shown in FIG. 1.

The store server 1 comprehensively manages a plurality of transactions subject to transaction processing realized by the store system 100 as described later. The store server 1 has, for example, a function similar to that of an existing POS server.

The virtual POS server 2 performs information processing for registering a purchased product for each transaction, making a payment for that purchased product, etc. in response to an external request. That is, the virtual POS server 2 virtually realizes the function of the existing POS terminal. The information processing performed by the virtual POS server 2 is customized to adapt to a difference in operation policy for each store. That is, for example, information processing performed by the store server 1 provided in the store system 100-1 information processing performed by the store server 1 provided in the store system 100-2 may be partially different.

The mobile controller 3 supports the virtual POS server 2 to perform the above information processing while using the user terminal 200 as a user interface device.

The communication server 4 performs communication processing for the store server 1, the virtual POS server 2, the mobile controller 3, and the accounting machine 5 to exchange data with the relay server 400, etc. via the communication network 500.

The accounting machine 5 determines a price for a purchased product for each transaction managed by the virtual POS server 2, and performs a process for causing the customer to make a payment of that price. Settlement methods that the accounting machine 5 makes available to customers for the above payment may be all or any part of well-known payment methods such as cash payment, credit card payment, electronic money payment, point payment, and code payment. Code payment is also referred to as mobile payment or smartphone payment. The accounting machine 5 may be operated by either a store clerk or a customer. As the accounting machine 5, for example, a self-type accounting machine used in an existing semi-self-type POS system can be used. The accounting machine 5 may have a function of performing information processing for registering a product as a purchased product. In this case, as the accounting machine 5, for example, a face-to-face POS terminal used in an existing POS system or a self-type POS terminal used in an existing self-type POS system can be used.

The access point 6 performs communication processing for enabling the user terminal 200 to access the in-store communication network 7 by wireless communication. As the access point 6 for example, a well-known communication device that performs wireless communication according to the IEEE802.11 standard can be used. The access point 6 is installed in the store so that the user terminal 200 can wirelessly communicate from anywhere on the sales floor of the store. Depending on the store scale, a plurality of access points 6 may be arranged in one store system 100.

As the in-store communication network 7, the Internet, a VPN, a LAN, a public communication network, a mobile communication network, etc. can be used alone or in combination as appropriate. However, typically, the in-store communication network 7 is a LAN.

In a store in which the store system 100 is installed, a two-dimensional code TCI for check-in is posted near an entrance thereof, and a two-dimensional code TCO for checkout is posted near an exit thereof. The two-dimensional code TCI represents check-in data for check-in. The two-dimensional code TCO represents checkout data for checkout. The check-in data and checkout data differ from store to store. Thus, when it is necessary to distinguish between the two-dimensional codes TCI and TCO for the store A and the two-dimensional codes TCI and TCO for the store B, the two-dimensional codes for the store A are expressed as two-dimensional codes TCIA and TCOA, and the two-dimensional codes for the store B are expressed as TCIB and TCOB.

The check-in data represents, for example, the following information.

(1) Operating version of store system 100. For example, the check-in data represented by the two-dimensional code TCIA represents an operating version of the store system 100-1. The check-in data represented by the two-dimensional code TCIB represents an operating version of the store system 100-2.

(2) Business operator code for identifying business operator that operates store in which store system 100 is installed.

For example, the check-in data represented by the two-dimensional code TCIA represents a business operator code assigned to a business operator that operates the store A. The check-in data represented by the two-dimensional code TCIB represents a business operator code assigned to a business operator that operates the store B.

(3) Store code for identifying store in which store system 100 is installed. For example, the check-in data represented by the two-dimensional code TCIA represents a store code assigned to the store A. The check-in data represented by the two-dimensional code TCIB represents a store code assigned to the store B. The store code may be one that can identify each of the stores that use the transaction processing system, or may be one that can identify each of a plurality of stores operated by the same business operator.

(4) Name of business operator that operates store in which store system 100 is installed. For example, the check-in data represented by the two-dimensional code TCIA represents a name of the business operator that operates the store A. The check-in data represented by the two-dimensional code TCIB represents a name of the business operator that operates the store B.

(5) Name of store in which store system 100 is installed. For example, the check-in data represented by the two-dimensional code TCIA represents a name of the store A. The check-in data represented by the two-dimensional code TCIB represents a name of the store B.

(6) Flag for distinguishing two-dimensional code TCI from two-dimensional code TCO. This flag in the check-in data is in a state representing that it is check-in data. This state is, for example, "1". This flag is common to all the two-dimensional codes TCI.

(7) IP address of communication server 4. For example, the check-in data represented by the two-dimensional code TCIA represents an IP address of the communication server 4 included in the store system 100-1. The check-in data represented by the two-dimensional code TCIB represents an IP address of the communication server 4 included in the store system 100-2.

(8) Domain name of relay server 400. This domain name is common to all the two-dimensional codes TCI. However, a plurality of relay servers 400 having different domain names may be used properly for each store. In this case, the check-in data represented by the two-dimensional code TCI represents a domain name of the relay server 400 used in the corresponding store.

(9) Address of electronic receipt server. An electronic receipt server is not included in the transaction processing system shown in FIG. 1, and provides an electronic receipt service via the communication network 500. For example, the check-in data represented by the two-dimensional code TCIA represents an address for accessing an electronic receipt server that provides an electronic receipt service used by the business operator that operates the store A via the communication network 500. The check-in data represented by the two-dimensional code TCIB represents an address for accessing an electronic receipt server that provides an electronic receipt service used by the business operator that operates the store B via the communication network 500. This address may be common to all the two-dimensional codes TCI, or any one of a plurality of addresses may be represented for each two-dimensional code TCI.

(10) Flag indicating whether user terminal 200 should use wireless communication with access point 6 or wireless communication with communication network 500 for exchanging data with store system 100. For example, in the store A, if the wireless communication with the access point 6 is used for exchanging data between the store system 100-1 and the user terminal 200, this flag is set to, for example, "1". For example, in the store B, if the wireless communication with the communication network 500 is used for exchanging data between the store system 100-2 and the user terminal 200, this flag is set to, for example, "0".

(11) SSID (service set identifier) for identifying access point 6. For example, the check-in data represented by the two-dimensional code TCIA represents an SSID that identifies the access point 6 included in the store system 100-1. The check-in data represented by the two-dimensional code TCIB represents an SSID of the access point 6 included in the store system 100-2.

(12) Password for accessing access point 6. For example, the check-in data represented by the two-dimensional code TCIA represents a password set in the access point 6 included in the store system 100-1. The check-in data represented by the two-dimensional code TCIB represents a password set in the access point 6 included in the store system 100-2.

(13) Identification number of security method used by access point 6. As this identification number, for example, "1" is assigned to a WPA2-PSK method, "2" to a WPA-PSK method, and "3" to a WEP method. For example, if the access point 6 included in the store system 100-1 uses the WPA2-PSK method as a security method, the check-in data represented by the two-dimensional code TCIA indicates "1" as this identification number. Further, for example, if the access point 6 included in the store system 100-2 uses the WPA-PSK method as a security method, the check-in data represented by the two-dimensional code TCIB indicates "2" as this identification number.

(14) Flag for identifying whether error occurs or operation is continued without error when user terminal 200 fails to connect to relay server 400. For example, in the store A, if the setting is such that an error occurs when the user terminal 200 fails to connect to the relay server 400, the check-in data represented by the two-dimensional code TCIA represents, for example, "1" as this flag. Further, for example, in the store B, if the setting is such that an operation is continued even when the user terminal 200 fails to connect to the relay server 400, the check-in data represented by the two-dimensional code TCIB represents, for example, "0" as this flag.

(15) Identification number of transmission mode regarding status of user terminal 200. This transmission mode includes, for example, a first mode, a second mode, and a third mode. As an identification number of this transmission mode, "1" is assigned to the first mode, "2" to the second mode, and "3" to the third mode. In the first mode, a status of the user terminal 200 is transmitted to the relay server 400. In the second mode, the status of the user terminal 200 is transmitted to the store system 100. In the third mode, the status of the user terminal 200 is not transmitted. For example, in the store A, if the first mode is applied as the transmission mode, the check-in data represented by the two-dimensional code TCIA indicates "1" as this identification number. Further, for example, in the store B, if the second mode is applied as the transmission mode, the check-in data represented by the two-dimensional code TCIB indicates "2" as this identification number.

(16) Identification number of transmission mode regarding log file in which log data of user terminal 200 is accumulated. This transmission mode includes, for example, a first mode, a second mode, a third mode, and a fourth mode. As an identification number of this transmission mode, "1" is assigned to the first mode, "2" to the second mode, "3" to the third mode, and "4" to the fourth mode. In the first mode, a log file is transmitted only to the relay server 400. In the second mode, the log file is transmitted only to the store system 100. In the third mode, the log file is transmitted to both the store system 100 and the relay server 400. In the fourth mode, the log file is not transmitted. For example, in the store A, if the first mode is applied as the transmission mode, the check-in data represented by the two-dimensional code TCIA "1" indicates as this identification number. Further, for example, in the store B, if the second mode is applied as the transmission mode, the check-in data represented by the two-dimensional code TCIB indicates "2" as this identification number.

(17) Host name or IP address used when transmitting log file to relay server 400 via communication network 500 by FTP (file transfer protocol).

(18) User name used when transmitting log file to relay server 400 via communication network 500 by FTP.

(19) Password used when transmitting log file to relay server 400 via communication network 500 by FTP.

(20) Path name of log file transmitted to relay server 400 via communication network 500 by FTP.

(21) Flag for identifying whether to delete check digit of UPC (universal product code), which is type of product code. For example, in the store A, if the operation does not delete this check the check-in data represented by the two-dimensional code TCIA indicates, for example, "1" as this flag. Further, for example, in the store B, if the operation is to delete this check digit, the check-in data represented by the two-dimensional code TCIB indicates, for example, "0" as this flag.

(22) Time until camera screen is automatically changed in user terminal 200. The check-in data represented by the two-dimensional code TCIA represents a preset time for the store A as this time. The check-in data represented by the two-dimensional code TCIB represents a preset time for the store B as this time.

(23) Time-out time when user terminal 200 communicates with store system 100 via access point 6. The check-in data represented by the two-dimensional code TCIA represents a preset time for the store A as this time. The check-in data represented by the two-dimensional code TCIB represents a preset time for the store B as this time.

(24) Number of times to allow retry when communication between user terminal 200 and store system 100 via access point 6 times out. The check-in data represented by the two-dimensional code TCIA represents the preset number of times for the store A as this number of times. The check-in data represented by the two-dimensional code TCIB represents the preset number of times for the store B as this number of times.

(25) Time-out time when user terminal t 200 communicates with store system 100 via relay server 400. The check-in data represented by the two-dimensional code TCIA represents a preset time for the store A as this time. The check-in data represented by the two-dimensional code TCIB represents a preset time for the store B as this time.

(26) Number of times to allow retry when communication between user terminal 200 and store system 100 via relay server 400 times out. The check-in data represented by the two-dimensional code TCIA represents the preset number of times for the store A as this number of times. The check-in data represented by the two-dimensional code TCIB represents the preset number of times for the store B as this number of times.

(27) Authentication data used in authentication process to authenticate declaration of end of confirmation regarding transaction targeting product that requires confirmation by store clerk. The check-in data represented by the two-dimensional code TCIA represents preset authentication data for the store A. The check-in data represented by the two-dimensional code TCIB represents preset authentication data for the store B. It is preferable that the authentication data be set differently for each store, but the same authentication data may be set in different stores.

(28) Data for identifying operation mode of store system 100. For example, if the store system 100-1 is set to a normal mode in which the transaction processing system is normally operated, the check-in data represented by the two-dimensional code TCIA represents, for example, "1" as this data. Further, for example, if the store system 100-2 is set to a demo mode in which the transaction processing system is demo-operated, the check-in data represented by the two-dimensional code TCIB represents, for example, "2" as this data.

(29) Data for identifying mode of data transfer to accounting machine 5. For example, if the store system 100-1 is set to a mode for requesting data transfer from the accounting machine 5 to the mobile controller 3, the check-in data represented by the two-dimensional code TCIA represents, for example, "1" as this data. Further, for example, if the store system 100-2 is set to a mode for transferring data from the mobile controller 3 to the accounting machine 5 without a request from the accounting machine 5, the check-in data represented by the two-dimensional code TCIB represents, for example, "2" as this data.

(30) Flag indicating whether or not to allow payment by code payment method by operation on user terminal 200. For example, if this code payment is allowed in the store A, the check-in data represented by the two-dimensional code TCIA represents, for example, "1" as this flag. Further, for example, if this code payment is not allowed in the store B, the check-in data represented by the two-dimensional code TCIB represents, for example, "0" as this flag.

(31) Flag for identifying whether or not to allow registration of product for which purchaser's age restriction is set (hereinafter referred to as age-restricted product) on user terminal 200. For example, if registration of an age-restricted product on the user terminal 200 is allowed in the store A, the check-in data represented by the two-dimensional code TCIA indicates, for example, "1" as this flag. Further, for example, if this code payment is not allowed in the store B, the check-in data represented by the two-dimensional code TCIB indicates, for example, "0" as this flag.

(32) Data for identifying input mode of membership code of point member. For example, if the store system 100-1 is set to a mode in which a membership code is manually entered, the check-in data represented by the two-dimensional code TCIA indicates, for example, "1" as this data. Further, for example, if the store system 100-2 is set to a mode in which a membership code is input by reading a bar code, the check-in data represented by the two-dimensional code TCIB indicates, for example, "2" as this data.

(33) Flag for identifying whether or not store clerk's confirmation is required when entering membership code when mode for manually entering membership code of point member is set. For example, if this confirmation is required at the store A, the check-in data represented by the two-dimensional code TCIA indicates, for example, "1" as this flag. Further, for example, if this confirmation is not required at the store B, the check-in data represented by the two-dimensional code TCIB indicates, for example, "0" as this flag.

(34) Threshold value for checking remaining battery level of user terminal 200 at check-in. This threshold value is set for each store or each business operator. For example, when the business operator that operates the store A defines this threshold value as "20%", the check-in data represented by the two-dimensional code TCIA indicates, for example, "20" as this threshold value. Further, for example, when the store B defines this threshold value as "25%", the check-in data represented by the two-dimensional code TCIB indicates, for example, "25" as this threshold value.

The above are examples of information represented by the check-in data. However, the check-in data may not include some of the various information indicated above. Further, the check-in data may represent information different from the various information indicated above.

FIG. 2 is a block diagram showing a main circuit configuration of the store server 1.

The store server 1 includes a processor 11, a main memory 12, an auxiliary storage unit 13, a communication interface 14, and a transmission path 15. The processor 11, the main memory 12, the auxiliary storage unit 13, and the communication interface 14 can communicate with each other via the transmission path 15. Then, the processor 11, the main memory 12, and the auxiliary storage unit 13 are connected by the transmission path 15 so as to form a computer for controlling the store server 1.

The processor 11 corresponds to a central part of the above computer. The processor 11 executes information processing for realizing various functions as the store server 1 according to information processing programs such as an operating system and an application program. The processor 11 may be, for example, a processing circuit such as a central processing unit (CPU), a graphics processing unit (GPU), an application specific integrated circuit (ASIC), a programmable logic device (e.g., a simple programmable logic device (SPLD), a complex programmable logic device (CPLD), and a field programmable gate array (FPGA)), etc. The processor 11 is not limited to a case in which it is formed as a single processing circuit, and a plurality of processing circuits may be combined into the processor 11. The same applies to the other processors according to the present embodiment.

The main memory 12 may be a volatile memory (random access memory) or a non-volatile memory (read-only memory, non-volatile random access memory). The main memory 12 stores the information processing programs and data necessary for information processing. The processor 11 realizes a predetermined function by reading and executing a program stored in the main memory 12. Instead of storing a program in the main memory 12, the program may be directly embedded in the processor 11. In this case, the processor 11 realizes a predetermined function by reading and executing a program embedded inside. Further, the predetermined function may be realized not only by the processor 11 executing a program, but also by a combination of logic circuits.

The auxiliary storage unit 13 corresponds to an auxiliary storage portion of the above computer. As the auxiliary storage unit 13, for example, a storage unit using a well-known storage device such as an electric erasable programmable read-only memory (EEPROM), a hard disk drive (HDD), or a solid state drive (SSD) can be used. The auxiliary storage unit 13 stores data used by the processor 11 in performing various processing, or data created by the processing in the processor 11. The auxiliary storage unit 13 stores the above information processing program.

The communication interface 14 performs data communication with each unit connected to the in-store communication network 7 according to a predetermined communication protocol. As the communication interface 14, a well-known communication device for LAN, for example, can be applied.

The transmission path 15 includes an address bus, a data bus, a control signal line, etc., and transmits data and control signals exchanged between the connected units. The transmission path 15 may be a serial transmission path or a parallel transmission path.

The auxiliary storage unit 13 stores a store management application APAA, which is one of the information processing programs. The store management application APAA is an application program and describes information processing for realizing the function as the store server 1 by being executed by the processor 11. The store management application APAA may be created separately for each store or so as to be adapted to store operating policies of each business operator that operates a store. For example, if the store A and the store B have different sales data management methods, the store management application APAA used in the store system 100-1 describes information processing for sales data management adapted to a sales data management method in the store A, and the store management application APAA used in the store system 100-2 describes information processing for sales data management adapted to a sales data management method in the store B.

A portion of a storage area of the auxiliary storage unit 13 is used as an area for storing a database group DBAA. The database group DBAA includes a plurality of databases for various types of information management. One of the databases included in the database group DBAA is a product database for managing products sold in the store. The product database is a set of data records associated with products that are subject to management. The data record in the product database contains data about the associated product, such as a product code, a price, and a product name. The product code is an identifier defined to identify the product for each stock keeping unit (SKU), and, for example, a Japanese article number (JAN) code is used. The product name is a name defined so that the product can be easily distinguished by humans. The price is an amount of compensation for the sale of the product.

One of the databases included in the database group DBAA is a user database for managing store users. The user database is a set of data records associated with customers registered as users. The data record in the user database contains data about the associated customer, such as a user code and attribute information for identifying a user. The user code is a unique identification code defined for each customer to identify each user individually. The attribute information may include name, gender, age, address, phone number, etc. The data records in the user database may also include payment information declared by a user. The payment information is, for example, a credit card number or code payment identifier (ID). When multiple payment methods are selectable, the payment information may include payment method codes for identifying the payment methods. In a case of stores that provide point services, the payment information may also include a point service ID, the number of points held, etc.

One of the databases included in the database group DBAA is a clerk terminal database. The clerk terminal database represents a terminal code as an identifier for identifying the clerk terminal 300 used in the store. The clerk terminal database is pre-set with a terminal code of a terminal that is defined as the clerk terminal 300 in the store, for example. Alternatively, authentication of a store clerk using the clerk terminal 300 may be performed, and a terminal code of the clerk terminal 300 that has been confirmed to be used by a predetermined store clerk may be set in the clerk terminal database. The database group DBAA can be used to determine, when there is an access to the store system 100 from the clerk terminal 300, whether or not the accessing terminal is a terminal designated for store clerk use. The terminal code of the clerk terminal 300 is an example of an identifier of the second terminal. The terminal code of the clerk terminal 300 may be in any form of information that can specify the clerk terminal 300.

In addition, the database group DBAA can include various other databases, such as those managed by a POS server in an existing POS system. The type of databases that the database group DBAA include, or what data in what structure those databases include, may be defined on a store-by-store basis.

FIG. 3 is a block diagram showing a main circuit configuration of the virtual POS server 2.

The virtual POS server 2 includes a processor 21, a main memory 22, an auxiliary storage unit 23, a communication interface 24, and a transmission path 25. The processor 21, main memory 22, auxiliary storage unit 23, and communication interface 24 can communicate with each other via the transmission path 25. Then, the processor 21, main memory 22, and auxiliary storage unit 23 are connected by the transmission path 25 to form a computer for controlling the virtual POS server 2. Outlines of functions of the processor 21, main memory 22, auxiliary storage unit 23, communication interface 24, and transmission path 25 are the same as those of the processor 11, main memory 12, auxiliary storage unit 13, communication interface 14, and transmission path 15, so descriptions thereof will be omitted.

However, the auxiliary storage unit 23 stores a virtual POS application APBA instead of the store management application APAA. The virtual POS application APBA is an application program and describes information processing for realizing functions as the virtual POS server 2 when executed by the processor 21. The virtual POS application APBA may be created separately for each store or so as to be adapted to the store operating policies of each business operator that operates a store. For example, if the store A provides a discount service that is not provided in the store B, then the virtual POS application APBA used in the store system 100-1 describes information processing to realize that discount service, and the virtual POS application APBA used in the store system 100-2 does not describe the information processing to realize that discount service.

For example, hardware with the virtual POS application APBA not stored in the auxiliary storage unit 23 and the virtual POS application APBA are provided separately. The virtual POS application APBA is then written to the auxiliary storage unit 23 in response to any worker's operation. Alternatively, the virtual POS server 2 may be provided with the virtual POS application APBA stored in the auxiliary storage unit 23. The virtual POS application APBA may be provided by being stored on a removable computer-readable storage medium such as a magnetic disk, magneto-optical disk, optical disk, or semiconductor memory, or by communication over a network.

Part of the storage area of the auxiliary storage unit 23 is used as an area to store a transaction database DBBA instead of the database group DBAA. The transaction database DBBA is a set of data records associated with transactions with customers who are shopping around in the store. The data record in the transaction database DBBA includes a transaction code and product data relating to a product already registered as a purchased product. The transaction code is a unique identification code set for each transaction to identify each individual transaction. The product data represents a product code, a product name, a price, and a quantity, etc. A structure of the transaction database DBBA may be individually defined for each store or so as to be adapted to the store operating policies of each store or each business operator that operates a store. The product data relating to a purchased product is an example of a content of a transaction related to a user. The transaction code is an example of a transaction identifier that identifies a purchase (transaction) of a product by a customer (user). The transaction code may be in any form of information that uniquely specifies a certain transaction. A part of a storage area of the auxiliary storage unit 23 is an example of the first storage unit.

FIG. 4 is a block diagram showing a main circuit configuration of the mobile controller 3.

The mobile controller 3 includes a processor 31, a main memory 32, an auxiliary storage unit 33, a communication interface 34, and a transmission path 35. The processor 31, main memory 32, auxiliary storage unit 33, and communication interface 34 can communicate with each other via the transmission path 35. Then, the processor 31, main memory 32, and auxiliary storage unit 33 are connected by the transmission path 35 to form a computer for controlling the mobile controller 3. Outlines of functions of the processor 31, main memory 32, auxiliary storage unit 33, communication interface 34, and transmission path 35 are the same as those of the processor 11, main memory 12, auxiliary storage unit 13, communication interface 14, and transmission path 15, so descriptions thereof will be omitted.

However, the auxiliary storage unit 33 stores a registration support application APCA instead of the store management application APAA. The registration support application APCA is an application program and describes information processing to be described later to support registration of a purchased product when executed by the processor 31. The registration support application APCA is common to each store system 100. However, various settings for information processing based on the registration support application APCA may be customized for each store system 100.

For example, hardware with the registration support application APCA not stored in the auxiliary storage unit 33 and the registration support application APCA are provided separately. The registration support application APCA is then written to the auxiliary storage unit 33 in response to a worker's operation. Alternatively, the mobile controller 3 may be provided with the registration support application APCA stored in the auxiliary storage unit 33. The registration support application APCA may be provided by being stored on a removable computer-readable storage medium such as a magnetic disk, magneto-optical disk, optical disk, or semiconductor memory, or by communication over a network.

A portion of a storage area of the auxiliary storage unit 33 is used as an area to store a transaction management database DBCA, a linkage database DBCB, and a registration database DBCC instead of the database group DBAA. Structures of these transaction management database DBCA, linkage database DBCB, and registration database DBCC are common to each store system 100.

FIG. 5 is a schematic diagram showing a data structure of a data record DRA included in the transaction management database DBCA.

The transaction management database DBCA is a set of data records DRA associated with the user terminals 200 used by customers in the store. Thus, when there is only one customer using the user terminal 200 in the store, the transaction management database DBCA includes one data record DRA. When there are no customers using the user terminal 200 in the store, the transaction management database DBCA does not contain the data record DRA. The data record DRA then includes fields FAA, FAB, and FAC.

In the field FAA, a terminal code, which is an identifier for identifying the associated user terminal 200, is set. For example, a unique identification code set for each communication terminal can be used as the terminal code to identify each individual communication terminal used as the user terminal 200. Alternatively, as the terminal code, for example, an identification code set for a smartphone POS application to be described later when that smartphone POS application is installed on the user terminal 200 can be used. The terminal code of the user terminal 200 is an example of an identifier of the first terminal. The terminal code of the user terminal 200 may be in any form of information that can specify the user terminal 200.

In the field FAB, a membership code, which is an identifier for identifying a customer using the associated user terminal 200, is set. In the field FAC, a transaction code, which is an identifier for identifying a transaction conducted using the associated user terminal 200, is set.

The data record DRA is an example of an association between the first terminal and a transaction. A portion of the storage area of the auxiliary storage unit 33 that stores the transaction management database DBCA is an example of the second storage unit.

FIG. 6 is a schematic diagram showing a data structure of a data record DRB included in the linkage database DBCB.

The linkage database DBCB is a set of data records DRB each associated with the clerk terminal 300 that is linked to a process of storing a content of a transaction in response to a request from the user terminal 200, as will be described later. Thus, when there is only one clerk terminal 300 that is linked, the linkage database DBCB includes only one data record DRB. When there is no clerk terminal 300 linked to the user terminal 200, the linkage database DBCB does not include the data record DRB. The data record DRB then includes fields FBA and FBB.

In the field FBA, a terminal code of the associated clerk terminal 300 is set. In the field FBB, a terminal code of the user terminal 200 to which the associated clerk terminal 300 is linked is set. The data record DRB is an example of an association between the user terminal 200 (first terminal) and the clerk terminal 300 (second terminal). A portion of the storage area of the auxiliary storage unit 33 that stores the linkage database DBCB is an example of a third storage unit.

FIG. 7 is a schematic diagram showing a data structure of a data record DRC included in the registration database DBCC.

The registration database DBCC is a set of data records DRC associated with transactions with customers who are shopping around in the store. The data record DRC then includes fields FCA and FCB. The data record DRC can also include fields FCC, FCD, . . . .

In the field FCA, a transaction code of an associated transaction is set. This transaction code is identical to the transaction code set in the field FAB of the data record DRA associated with the user terminal 200 used in the associated transaction. In the field FCB, registration data for product registration attempted for the associated transaction is set. The registration data will be described later.

The data record DRC includes the fields FCC and beyond if registration of more than one purchased product is attempted for the associated transaction. In the fields FCC and beyond, registration data similar to that of the field FCB is then set.

FIG. 8 is a block diagram showing a main circuit configuration of the user terminal 200.

The user terminal 200 includes a processor 201, a main memory 202, an auxiliary storage unit 203, a touch panel 204, a camera 205, a sound unit 206, a sensor group 207, a wireless communication unit 208, a mobile communication unit 209, a transmission path 210, etc. The processor 201 can communicate with the main memory 202, auxiliary storage unit 203, touch panel 204, camera 205, sound unit 206, sensor group 207, wireless communication unit 208, and mobile communication unit 209 via the transmission path 210. The processor 201, main memory 202, and auxiliary storage unit 203 are connected by the transmission path 210 to form a computer for controlling the user terminal 200. Outlines of functions of the processor 201, main memory 202, auxiliary storage unit 203, and transmission path 210 are equivalent to those of the processor 11, main memory 12, auxiliary storage unit 13, and transmission path 15, so descriptions thereof will be omitted.

The touch panel 204 functions as an input device and a display device of the user terminal 200.

The camera 205 includes an optical system and an image sensor, and the image sensor generates image data representing an image in a field of view formed by the optical system.

The sound unit 206 outputs various sounds, such as voice and melodies.

The sensor group 207 includes various sensors such as an angular rate sensor and a GPS (global positioning system) sensor.

The wireless communication unit 208 exchanges data with the access point 6 through wireless communication according to wireless communication protocols. As the wireless communication unit 208, for example, well-known communication devices compliant with the IEEE802.11 standard can be used.

The mobile communication unit 209 is an interface for data communication via the communication network 500. As the mobile communication unit 209, for example, a well-known communication device for data communication via a mobile communication network can be used.

The auxiliary storage unit 203 stores a smartphone POS application APDA, which is one of the information processing programs. The smartphone POS application APDA is an application program and describes information processing to be described later to make the user terminal 200 function as a user interface for customers of the store system 100 when executed by the processor 201. The smartphone POS application APDA is commonly used by multiple user terminals 200.

Figure 9:
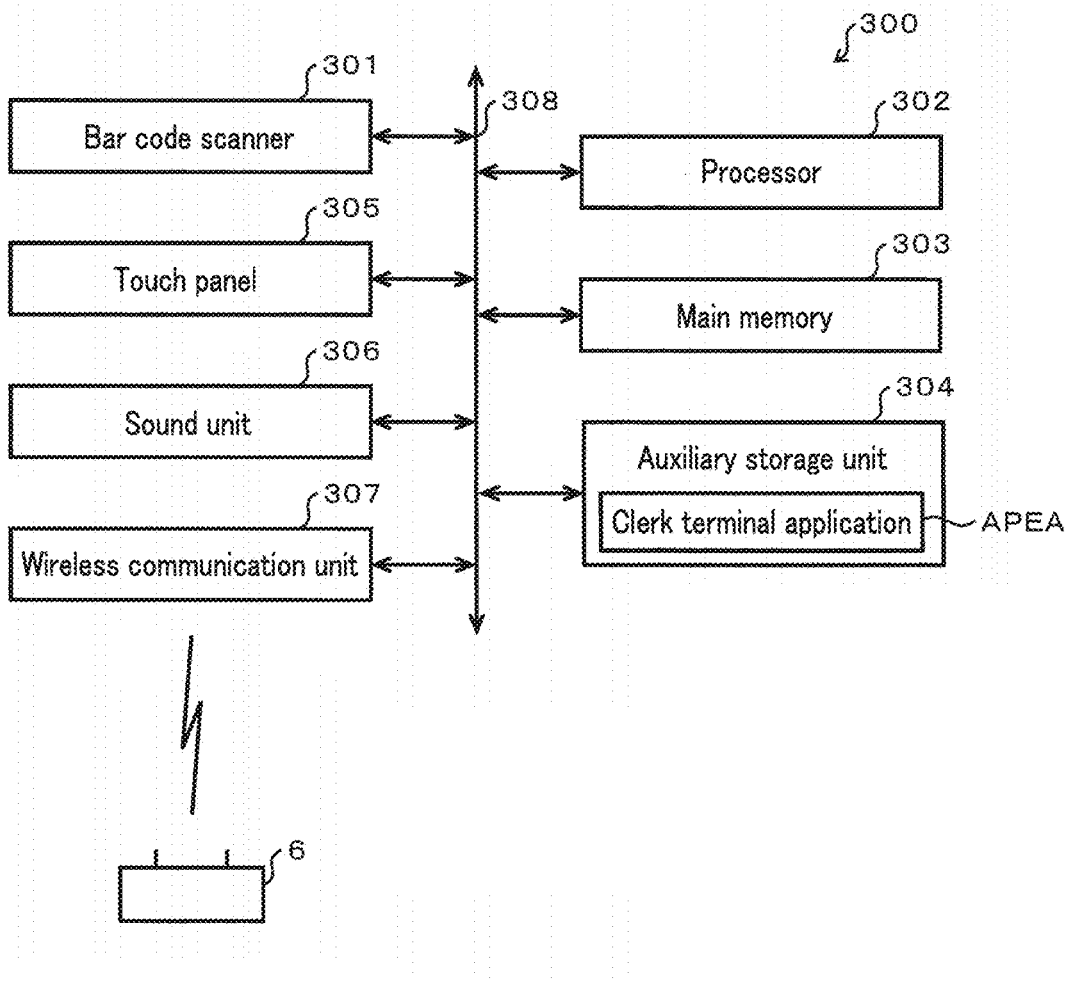
FIG. 9 is a block diagram showing a main circuit configuration of a clerk terminal shown in FIG. 1.

FIG. 9 is a block diagram showing a main circuit configuration of the clerk terminal 300.

In addition to the bar code scanner 301, the clerk terminal 300 includes a processor 302, a main memory 303, an auxiliary storage unit 304, a touch panel 305, a sound unit 306, a wireless communication unit 307, a transmission path 308, etc. The processor 302 can communicate with the bar code scanner 301, main memory 303, auxiliary storage unit 304, touch panel 305, sound unit 306, and wireless communication unit 307 via the transmission path 308. The processor 302, main memory 303, and auxiliary storage unit 304 are connected by the transmission path 308 to form a computer for controlling the clerk terminal 300. Outlines of functions of the processor 302, main memory 303, auxiliary storage unit 304, touch panel 305, sound unit 306, wireless communication unit 307, and transmission path 308 are equivalent to those of the processor 11, main memory 12, auxiliary storage unit 13, touch panel 204, sound unit 206, wireless communication unit 208, and transmission path 15, so descriptions thereof will be omitted.

The auxiliary storage unit 304 stores a clerk terminal application APEA, which is one of the information processing programs. The clerk terminal application APEA is an application program and describes information processing to be described later to make the clerk terminal 300 function as a user interface for store clerk use of the store system 100 when executed by the processor 302. The clerk terminal application APEA is commonly used in the clerk terminals 300.

As hardware of the clerk terminal 300, for example, a general-purpose tablet computer can be used. The hardware with the clerk terminal application APEA not stored in the auxiliary storage unit 304, or with another version of the same type of application program stored in the auxiliary storage unit 304 and the clerk terminal application APEA, may be provided separately. In this case, the clerk terminal 300 is formed by writing the clerk terminal application APEA to the auxiliary storage unit 304 in response to any worker's operation. The clerk terminal 300 may be provided with the clerk terminal application APEA stored in the auxiliary storage unit 304. The clerk terminal application APEA can be provided by being stored on a removable recording medium such as a magnetic disk, magneto-optical disk, optical disk, or semiconductor memory, or through communication over a network.

Next, an operation of a transaction processing system formed as described above will be described. Contents of various processing described below are examples, and the order of some processes can be changed, some processes can be omitted, or other processes can be added as appropriate. For example, in the following description, descriptions of some processes are omitted in order to make it easier to understand characteristic operations of the present embodiment. For example, if some error occurs, some processing may be performed to address the error, but some of such processing is omitted.

A service provided to customers by an operation of the transaction processing system described below is referred to as a smartphone POS service.

The user terminal 200 exchanges data with the store system 100 in order to use the smartphone POS service, and whether to use wireless communication with the access point 6 or with the communication network 500 for this purpose depends on a state of a flag included in check-in data. However, for simplicity of description, the following describes the case where only wireless communication with the access point 6 is used. A state of a flag included in check-in data determines which mode of data transfer from the virtual POS server 2 to the accounting machine 5 is used to cause the accounting machine 5 to perform accounting, a mode in which the accounting machine 5 requests data transfer to the mobile controller 3 or a mode in which data is transferred from the mobile controller 3 to the accounting machine 5 without a request from the accounting machine 5. However, for simplicity of description, it is assumed below that the mode in which the accounting machine 5 requests data transfer to the mobile controller 3 is fixedly used.

In order to use the smartphone POS service, customers must install the smartphone POS application APDA on their own smartphone or other device and make it available as a user terminal 200. Alternatively, the customer can borrow a user terminal 200, which consists of a tablet computer, etc. with the smartphone POS application APDA installed, at the store. The customer then enters one of the stores where the store system 100 is installed, with the user terminal 200 in a state where information processing based on the smartphone POS application APDA is activated.

Now, in the user terminal 200, the processor 201 executes the smartphone POS application APDA to perform predetermined information processing.

FIGS. 10, 11, 12, and 13 are flowcharts of the information processing performed by the processor 201 executing the smartphone POS application APDA.

First, as ACT 101 shown in FIG. 10, the processor 201 generates image data for a main menu screen to be displayed on the touch panel 204 so that the main menu screen is displayed on the touch panel 204. The main menu screen is a screen for receiving a specification of any one of several processes to be performed based on the smartphone POS application APDA. A plurality of GUI elements are arranged on the main menu screen, including a graphical user interface (GUI) element for specifying a start of shopping. The GUI element is a soft key, for example.

As ACT 102, the processor 201 confirms whether or not a start of shopping is specified. The processor 201 then determines NO if the corresponding specification is not confirmed, and proceeds to ACT 103.

As ACT 103, the processor 201 confirms whether or not a specification other than the start of shopping is made. The processor 201 then determines NO if the corresponding specification is not confirmed, and returns to ACT 102.

Thus, the processor 201 waits for some specification to be made on the main menu screen as ACT 102 and ACT 103. The processor 201 then determines YES in ACT 103 if a specification other than the start of shopping is made, and proceeds to the specified process. A description of the process of the processor 201 in this case is omitted.

When a customer enters a store to start shopping, he/she performs a predetermined operation to specify the start of shopping on the main menu screen.

If an operation to specify the start of shopping is detected on, for example, the touch panel 204, the processor 201 determines YES in ACT 102, and proceeds to ACT 104.

As ACT 104, the processor 201 generates image data for a scan screen for check-in to be displayed on the touch panel 204 so that the scan screen for check-in is displayed on the touch panel 204. The scan screen for check-in is a screen that prompts the customer to read a two-dimensional code TCI for check-in. The processor 201, for example, activates the camera 205 and generates a scan screen in which an image obtained by the camera 205 is overlaid with a text message urging the customer to read the two-dimensional code TCI and a line indicating an approximate position over which the two-dimensional code TCI should be held.

Once the scan screen is displayed on the touch panel 204, the customer points the camera 205 at the two-dimensional code TCI posted near the store entrance so that the two-dimensional code TCI appears on the scan screen.

As ACT 105, the processor 201 waits for the two-dimensional code to be read. At this time, the processor 201 repeatedly analyzes an image obtained by the camera 205 and attempts to read the two-dimensional code. This two-dimensional code reading may be done as a process based on the smartphone POS application APDA, or as a process based on another application program for reading two-dimensional codes. The processor 201 then determines YES if the two-dimensional code is read, and proceeds to ACT 106.

As ACT 106, the processor 201 confirms whether or not data represented by the read two-dimensional code is check-in data. The processor 201 then determines NO if it is not check-in data, and returns to ACT 105. At this time, the processor 201 may display a screen for informing the customer that an incorrect two-dimensional code has been read on the touch panel 204.

If it is confirmed that the data represented by the read two-dimensional code is check-in data, the processor 201 determines YES in ACT 106, and proceeds to ACT 107. As ACT 107, the processor 201 stores the read check-in data in the main memory 202 or the auxiliary storage unit 203.

As ACT 108, the processor 201 requests a check-in to the mobile controller 3. Specifically, the processor 201 establishes wireless communication between the wireless communication unit 208 and the access point 6 based on data shown in the check-in data. For example, if the camera 205 is pointed at the two-dimensional code TCIA by the customer in the store A, the processor 201 establishes wireless communication with the access point 6 provided in the store system 100-1 based on the check-in data represented by the two-dimensional code TCIA. The processor 201 then transmits request data for requesting check-in to the mobile controller 3 via the wireless communication with the access point 6. If the wireless communication with the access point 6 provided in the store system 100-1 is established as described above, that request data is transmitted to the mobile controller 3 provided in the store system 100-1 via the access point 6 and the in-store communication network 7 provided in the store system 100-1. The processor 201 includes identification data for identifying that the request is a check-in request and the terminal code of its own terminal in the request data for requesting check-in. If the customer is a registered user of the smartphone POS service and has a membership code, the processor 201 also includes that membership code in the request data. The membership code is, for example, stored in the auxiliary storage unit 203 of the user terminal 200. The processor 201 may include other data such as data for authenticating the customer in the request data.

Various requests from the user terminal 200 to the mobile controller 3 to be described below are realized by sending request data containing identification data for identifying a reason for the request from the user terminal 200 to the mobile controller 3 via the access point 6 and the in-store communication network 7 in the same manner as described above.

In the mobile controller 3, when the request data for requesting check-in is received by the communication interface 34, the processor 31 starts execution of the registration support application APCA and performs information processing (hereinafter referred to as "transaction processing") related to a transaction with the customer who is about to check-in.

Figure 14:
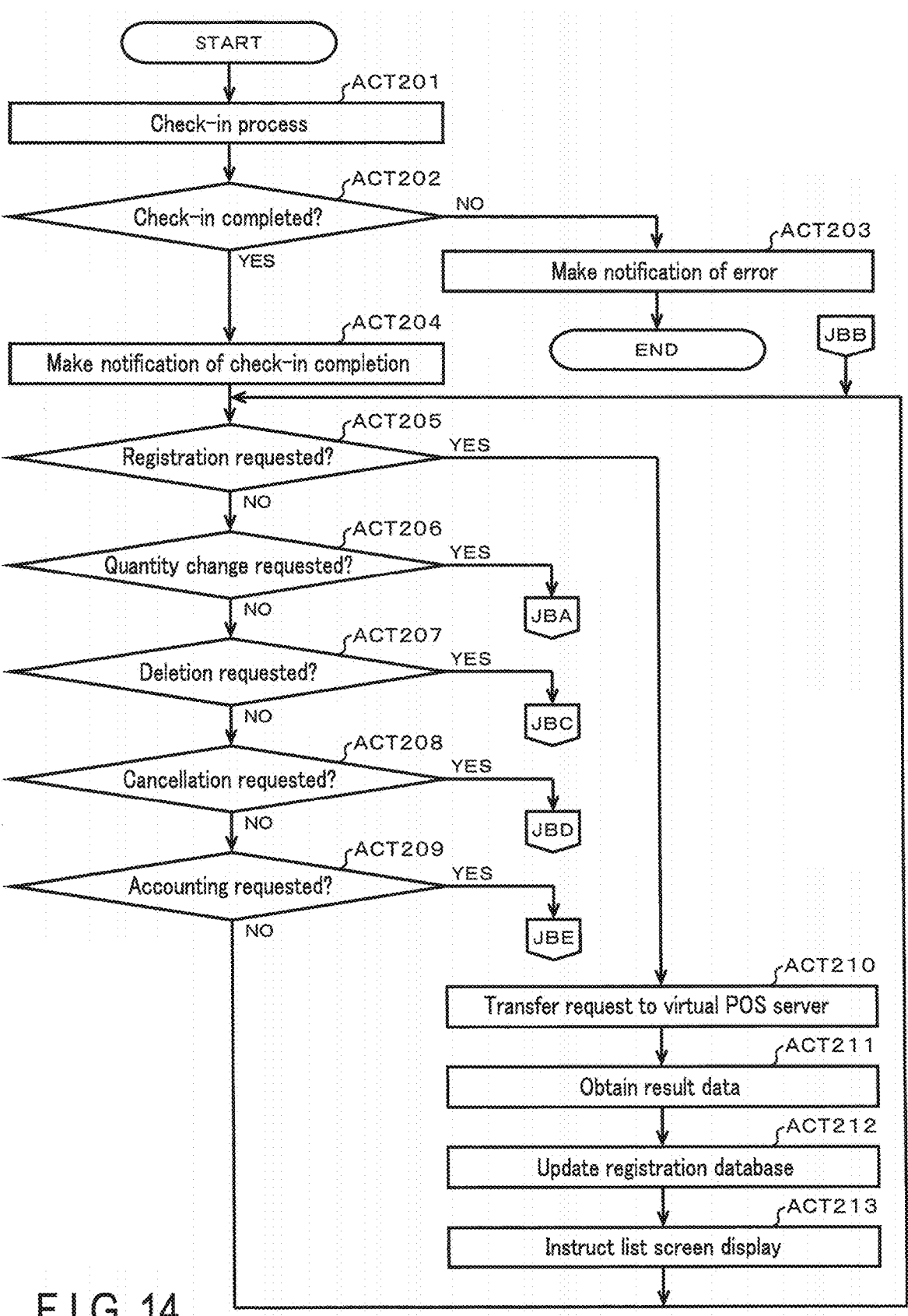
FIG. 14 is a flowchart of transaction processing performed by a processor shown in FIG. 4.
Figure 15:
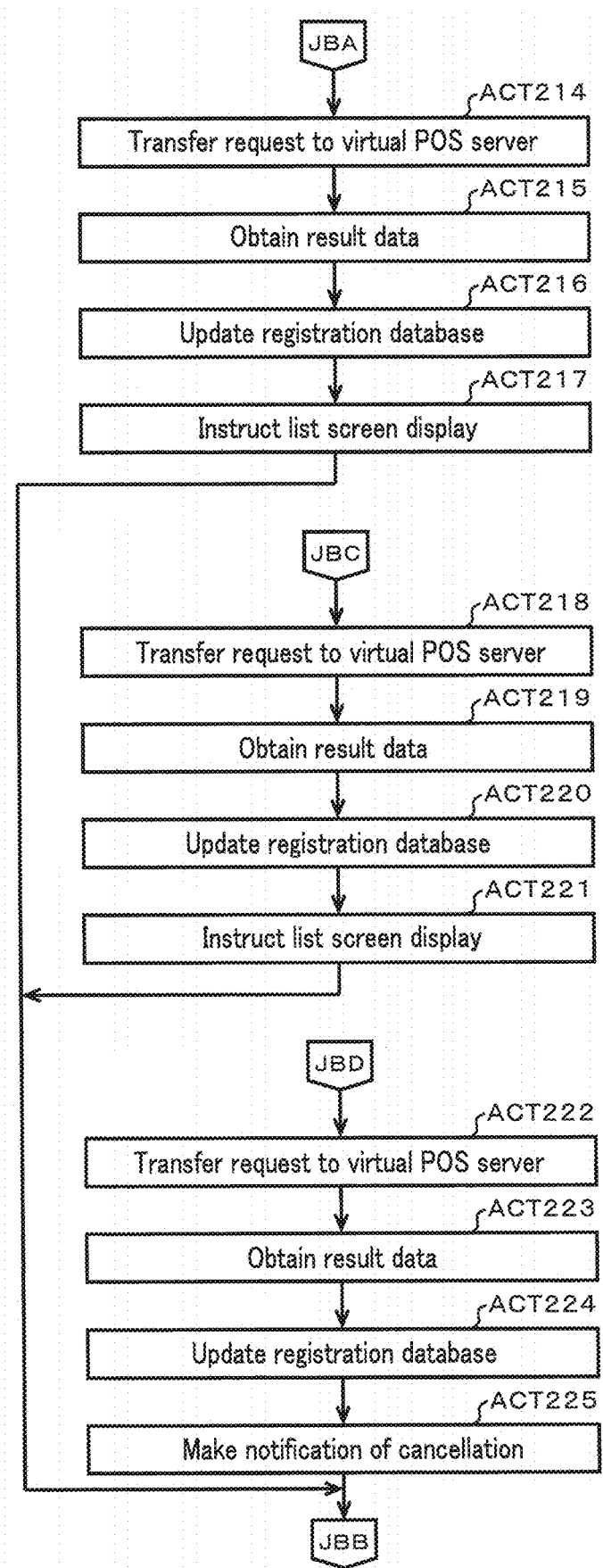
FIG. 15 is a flowchart of transaction processing performed by the processor shown in FIG. 4.

FIGS. 14, 15, and 16 are flowcharts of transaction processing performed by the processor 31 executing the registration support application APAC.

The processor 31 starts that transaction processing each time the request data for requesting check-in is received by the communication interface 34. If transaction processing started based on another request has already been performed, new transaction processing is started in parallel with it. In other words, the processor 31 may perform multiple transaction processing in parallel, respectively targeting a plurality of user terminals 200. In the following, when simply denoting "user terminal 200", it shall refer to the user terminal 200 that is the subject of the transaction processing being described.

The processor 31 performs a check-in process as ACT 201 in FIG. 14. The processor 31, for example, requests the virtual POS server 2 to start a transaction and receives notification of a transaction code. The processor 31 then adds a new data record DRA with the terminal code included in the request data set in the field FAA to the transaction management database DBCA. If the request data includes a membership code, the processor 31 sets that membership code in the field FAB of the new data record DRA. The processor 31 sets the above reported transaction code in the field FAC of the new data record DRA. This initiates management of the transaction to be conducted using the user terminal 200 that requested check-in.

In the virtual POS server 2, if the start of transaction is requested from the mobile controller 3, the processor 21 determines a transaction code according to a predetermined rule and starts a registration process of a purchased product in association with that transaction code. The processor 21 also notifies the mobile controller 3 of the determined transaction code.

As ACT 202, the processor 31 confirms whether or not the check-in process is successfully completed. The processor 31 then determines NO if the check-in process is not completed successfully due to some anomaly, and proceeds to ACT 203.

As ACT 203, the processor 31 notifies the user terminal 200 of an error. The processor 31, for example, transmits notification data for error notification to the user terminal 200 via the in-store communication network 7 and the access point 6. The processor 31 includes identification data for identifying it is a that notification of an error in the notification data. The processor 31 may include an error code representing a cause of the error in the notification data.

Various types of notifications from the mobile controller 3 to the user terminal 200 to be described below are realized by sending notification data containing identification data for identifying a reason for the notification from the mobile controller 3 to the user terminal 200 via the in-store communication network 7 and the access point 6 in the same manner as described above.

The processor 31 then ends the transaction processing.

The processor 31, on the other hand, determines YES in ACT 202 if the check-in process is successfully completed, and proceeds to ACT 204.

As ACT 204, the processor 31 notifies the user terminal 200 of the check-in completion.

At the user terminal 200, the processor 201 proceeds to ACT 109 after requesting check-in in ACT 108 in FIG. 10.

As ACT 109, the processor 201 confirms whether or not it is notified of the check-in completion. The processor 201 then determines NO if that notification is not confirmed, and proceeds to ACT 110.

As ACT 110, the processor 201 confirms whether or not it is notified of a check-in error. The processor 201 then determines NO if that notification is not confirmed and returns to ACT 109.

Thus, the processor 201 waits to be notified of a check-in completion or an error as ACT 109 and ACT 110. The processor 201 then determines YES in ACT 110 if notification data for the above-described error notification is received by the wireless communication unit 208, and proceeds to ACT 111.

As ACT 111, the processor 201 generates image data for an error screen to be displayed on the touch panel 204 so that the error screen is displayed on the touch panel 204. The error screen is a screen that informs customers that they cannot check in. If it is instructed to resolve the error screen display by, for example, operating a GUI element displayed on the error screen, the processor 201 returns to ACT 101.

Figure 11:
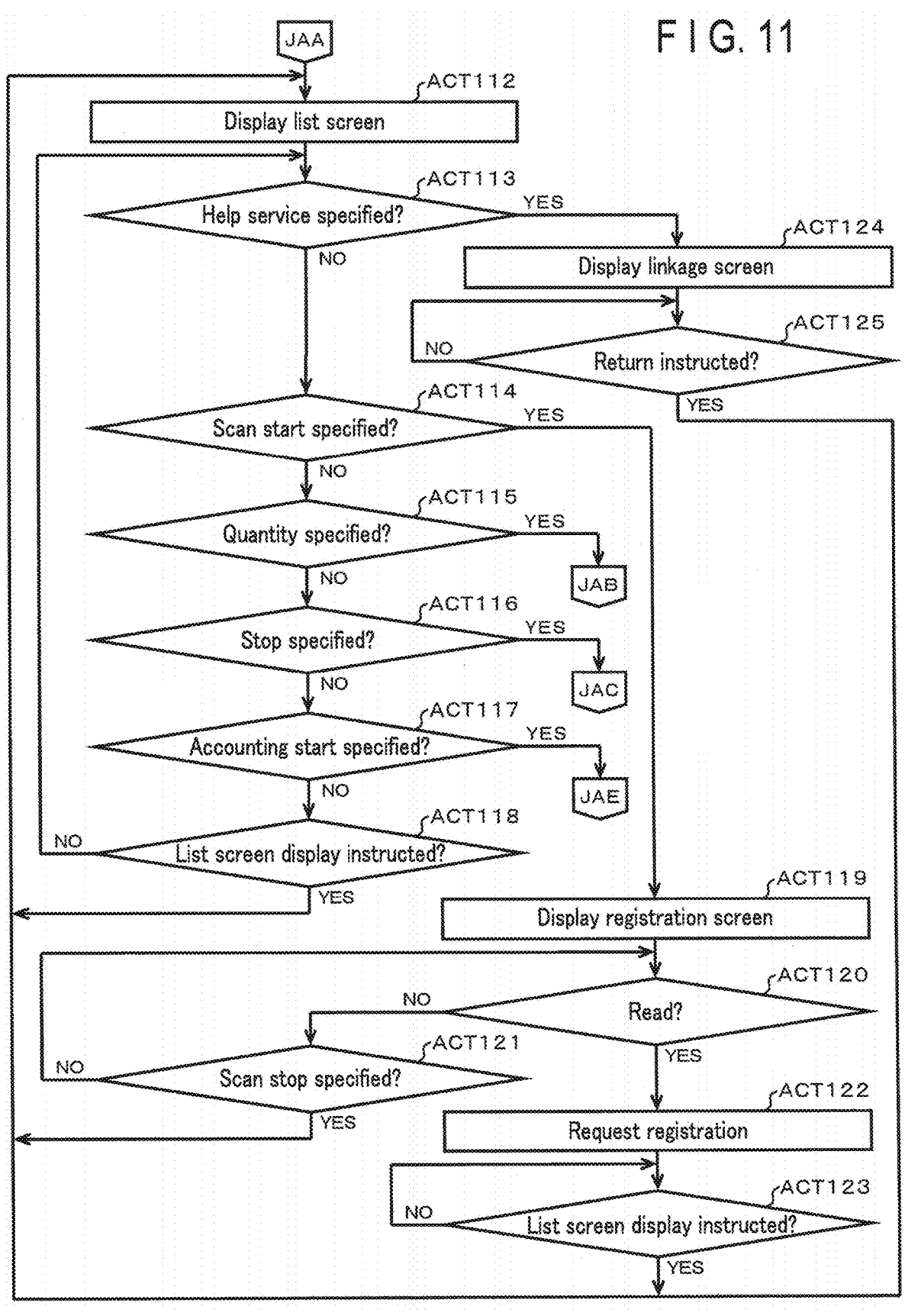
FIG. 11 is a flowchart of information processing performed by the processor shown in FIG. 8.

The processor 201, on the other hand, determines YES in ACT 109 if notification data for the above-described check-in completion notification is received by the wireless communication unit 208, and proceeds to ACT 112 in FIG. 11.

As ACT 112, the processor 201 generates image data for a list screen to be displayed on the touch panel 204 so that the list screen is displayed on the touch panel 204. The list screen is a screen that shows a list of registered purchased products.

FIG. 17 is a diagram showing an example of a list screen SCA to be presented to the customer.

The list screen SCA includes display areas ARAA and ARAB and buttons BUAA, BUAB, BUAC, and BUAD. The display area ARAA shows the total number of purchased products and the total amount to be paid for the purchased products. The display area ARAB shows a list of purchased products. The button BUAA is a soft key for the customer to specify that he/she wants to cancel all the purchased products and stop shopping. The button BUAB is a soft key for the customer to specify that he/she wants to start scanning a product to be registered as a purchased product. The button BUAC is a soft key for the customer to specify that he/she wants to start accounting. The button BUAD is a soft key for the customer to specify a help service to be described later.

The list screen SCA shown in FIG. 17 indicates a state in which the purchased products have not yet been registered. Thus, both the total number and the total amount are indicated as "0" in the display area ARAA, and nothing is indicated in the display area ARAB.

As ACT 113 in FIG. 11, the processor 201 confirms whether or not a start of a help service is specified. The processor 201 then determines NO if the corresponding specification is not confirmed, and proceeds to ACT 114.

As ACT 114, the processor 201 confirms whether or not a start of scanning of products is specified. The processor 201 then determines NO if the corresponding specification is not confirmed, and proceeds to ACT 115.

As ACT 115, the processor 201 confirms whether or not a change in quantity is specified. The processor 201 then determines NO if the corresponding specification is not confirmed, and proceeds to ACT 116.

As ACT 116, the processor 201 confirms whether or not a stop of shopping is specified. The processor 201 then determines NO if the corresponding specification is not confirmed, and proceeds to ACT 117.

As ACT 117, the processor 201 confirms whether or not a start of accounting is specified. The processor 201 then determines NO if the corresponding specification is not confirmed, and proceeds to ACT 118.

As ACT 118, the processor 201 confirms whether or not display of a list screen is instructed. The processor 201 then determines NO if the corresponding instruction is not confirmed, and returns to ACT 113.

Thus, as ACT 113 through ACT 118, the processor 201 waits for any one of the start of help, start of scanning, quantity, stop, and start of accounting to be specified or for the display of the list screen to be instructed.

Now, at the mobile controller 3, the processor 31 proceeds to ACT 205 after making the notification of the check-in completion in ACT 204 in FIG. 14.

As ACT 205, the processor 31 confirms whether or not the user terminal 200 requests registration of a product to be purchased. The processor 31 then determines NO if the corresponding request is not confirmed, and proceeds to ACT 206.

As ACT 206, the processor 31 confirms whether or not the user terminal 200 requests a quantity change. The processor 31 then determines NO if the corresponding request is not confirmed, and proceeds to ACT 207.

As ACT 207, the processor 31 confirms whether or not the user terminal 200 requests deletion of a purchased product. The processor 31 then determines NO if the corresponding request is not confirmed, and proceeds to ACT 208.

As ACT 208, the processor 31 confirms whether or not the user terminal 200 requests cancellation of a purchased product. The processor 31 then determines NO if the corresponding request is not confirmed, and proceeds to ACT 209.

As ACT 209, the processor 31 confirms whether or not the user terminal 200 requests accounting. The processor 31 then determines NO if the corresponding request is not confirmed, and returns to ACT 205.

Thus, as ACT 205 through ACT 209, the processor 31 waits for the user terminal 200 to request any one of the registration, quantity change, deletion, cancellation, and accounting.

If the customer registers a product as a purchased product, he/she specifies a start of scanning by a predetermined operation such as touching the button BUAB on the list screen SCA. In response, the processor 201 determines YES in ACT 114 in FIG. 11, and proceeds to ACT 119.

As ACT 119, the processor 201 again generates image data for a registration screen to be displayed on the touch panel 204 so that the registration screen is displayed on the touch panel 204. The registration screen is a screen that prompts the customer to read a bar code representing a product code of the product to be registered as a purchased product.

FIG. 18 is a diagram showing an example of a registration screen SCB to be presented to the customer.

The registration screen SCB includes a display area ARBA, a message MEBA, and a button BUBA. The display area ARBA displays an image obtained by the camera 205. The message MEBA is a text message that prompts the customer to read a bar code of a product. The button BUBA is a soft key for the customer to specify that he/she wants to stop scanning of a product code.

The processor 201, for example, activates the camera 205 and generates a registration screen SCB by overlaying an image obtained by the camera 205 with an image representing a line representing a range of the display area ARBA, the message MEBA, and the button BUBA.

As ACT 120 in FIG. 11, the processor 201 confirms whether or not a bar code is read. At this time, the processor 201 analyzes the image obtained by the camera 205 and attempts to read the bar code. This bar code reading may be done as a process based on the smartphone POS application APDA, or as a process based on another application program for reading bar codes. The processor 201 then determines NO if the bar code is not read, and proceeds to ACT 121.

As ACT 121, the processor 201 confirms whether or not a stop of scanning is specified. The processor 201 then determines NO if the corresponding specification is not confirmed, and returns to ACT 120.

Thus, as ACT 120 and ACT 121, the processor 201 waits for the bar code to be read or for the scan stop to be specified.

If the customer wishes to return to the list screen SCA display state without scanning this time, he/she specifies the scanning stop by a predetermined operation such as touching the button BUBA. In response, the processor 201 determines YES in ACT 121, and returns to ACT 112. In this case, the registration status of the purchased product is not changed, so the processor 201 again generates image data for the list screen SCA in the same state as it was displayed on the touch panel 204 before displaying a deletion screen, so that the list screen SCA in the same state as it was displayed on the touch panel 204 before displaying the deletion screen is displayed again on the touch panel 204.

If the registration screen SCB is displayed on the touch panel 204, the customer points the camera 205 at a product so that a bar code displayed on the product to be registered as a purchased product is reflected in the display area ARBA. In response, the processor 201 determines YES in ACT 120, and proceeds to ACT 122.

As ACT 122, the processor 201 requests registration to the mobile controller 3. The processor 201 includes data (hereinafter referred to as bar code data) represented by the read bar code in the request data to be transmitted here.

If the registration of a purchased product is requested by the user terminal 200 as described above, the processor 31 determines YES in ACT 205 in FIG. 14, and proceeds to ACT 210.

As ACT 210, the processor 31 notifies the virtual POS server of a transaction code and transfers the registration request (request data). The processor 31 refers to the transaction management database DBCA by using the terminal code of the user terminal 200 making the registration request, and obtains the transaction code corresponding to the user terminal 200. The processor 31 may then add the transaction code to the request data sent from the user terminal 200 and transfer it to the virtual POS server 2, or add the transaction code to the request data after conversion by some process and send it to the virtual POS server 2. However, the processor 31 notifies the virtual POS server 2 of the bar code data contained in the request data sent from the user terminal 200.

By executing the virtual POS application APBA, the processor 21 at the virtual POS server 2 assumes that the bar code data included in the request data sent from the mobile controller 3 is read by a bar code scanner provided in an existing POS terminal, and attempts to register the purchased product through the same process as that of the existing POS terminal. However, for some reason, a product code represented by bar code data may not be registered in a product database. Further, some products may have a different bar code on them than the one that represents the product code. In these cases, the processor 21 will then fail to register the purchased product and an error will occur.

Thus, due to the transferring of the registration request from the user terminal 200 by the processor 31 of the mobile controller 3 and the registration of the purchased product by the processor 21 of the virtual POS server 2 based on this registration request, the product data sent from the user terminal 200, which is an example of the first terminal, is stored in the transaction database DBBA in the auxiliary storage unit 23 of the virtual POS server 2 as the product to be purchased by the user (customer) of the user terminal 200. Therefore, the processor 21 executes the virtual POS application APBA and the processor 31 executes the registration support application APCA, thereby realizing the function as a first registration unit by the computer (virtual POS server 2) with the processor 21 as the central part and the computer (mobile controller 3) with the processor 31 as the central part.

The processor 21 transmits result data representing a result of such processing to the mobile controller 3. If the registration of the purchased product is correctly performed, the processor 21 includes in the result data identification data for identifying that it is notification of a regular registration, as well as the product code, product name, and price of the registered product. In the case of an error, the processor 21 includes in the result data identification data for identifying that it is a notification of an error and the bar code data sent with the registration request.

The processor 31 at the mobile controller 3 transfers the registration request in ACT 210, and then proceeds to ACT 211.

As ACT 211, the processor 31 obtains the result data transmitted from the virtual POS server as described above. The processor 31 stores the obtained result data in the main memory 32 or the auxiliary storage unit 33.

As ACT 212, the processor 31 updates the registration database DBCC based on the above result data. This updating of the registration database DBCC is done, for example, as follows.

First case: a notification is for a regular registration, and the data record DRC associated with a transaction to be processed does not include registration data containing a reported product code.

In this case, the processor 31 adds a new field after the last field already existing in the data record DRC associated with the transaction to be processed, and adds new registration data to that field. The processor 31 includes in the new registration data the reported product code, an error flag set to "O" indicating that it is not an error, reported product name and price, a quantity set to "1", and a cancellation flag set to "0" indicating that it has not been canceled. Thus, the registration data added in this case will have the structure shown in the upper right side of FIG. 7.

Second case: a notification is for a regular registration, and the data record DRC associated with a transaction to be processed includes registration data containing a reported product code, but a cancellation flag for that registration data is "1", indicating that the registration data has been canceled.

In this case, the processor 31 processes in the same manner as in the first case described above.

Third case: a notification is for a regular registration, and the data record DRC associated with a transaction to be processed includes registration data containing a reported product code, and a cancellation flag for that registration data is "0".

In this case, the processor 31 rewrites a value of a quantity included in the registration data which contains the reported product code and whose cancellation flag is "0" to one larger value.

Fourth case: a notification is for an error.

In this case, the processor 31 adds a new field after the last field already existing in the data record DRC associated with a transaction to be processed, and adds new registration data to that field. The processor 31 includes reported bar code data and an error flag set to "1" indicating an error in the new registration data. Thus, the registration data added in this case will have the structure shown in the lower right side of FIG. 7.

When updated by the processor 31 in this manner, the registration database DBCC represents a list of purchased products already registered with the virtual POS server 2, plus a record of any bar code readings that resulted in an error.

The processor 31 may store the bar code data sent in the registration request in the main memory 32 or in the auxiliary storage unit 33, and in the fourth case described above, this stored bar code data may be included in the registration data. In this case, the processor 21 at the virtual POS server 2 does not have to include the bar code data in the result data. The processor 31 may also retrieve the product code from the stored bar code data and process the first to third cases based on this product code. The product name and price may also be obtained by the processor 31 from the store server 1, etc. based on the product code.

The processor 31 then proceeds to ACT 213.

As ACT 213, the processor 31 instructs the user terminal 200 to display the list screen SCA. The processor 31, for example, transmits instruction data containing identification data for identifying that the instruction is an instruction to display the list screen SCA to the user terminal 200 via the in-store communication network 7 and the access point 6. The processor 31 includes the product code, product name, price, and quantity contained in the data record DRC associated with the transaction to be processed in the registration database DBCC in the instruction data.

Various instructions from the mobile controller 3 to the user terminal 200 described below are realized by sending instruction data containing identification data for identifying a reason for the instruction from the mobile controller 3 to the user terminal 200 via the in-store communication network 7 and the access point 6 in the same manner as described above.

After this, the processor 31 returns to the waiting state of ACT 205 through ACT 209.

At the user terminal 200, the processor 201 requests the registration in ACT 122 in FIG. 11, and then proceeds to ACT 123.

As ACT 123, the processor 201 waits for display of the list screen SCA to be instructed. The processor 201 then determines YES if the display of the list screen SCA is instructed by the mobile controller 3 as described above, and returns to ACT 112 to generate image data for the list screen SCA to be displayed on the touch panel 204 so that the list screen SCA is again displayed on the touch panel 204. At this time, the processor 201 makes the list screen SCA a screen showing the product name, price, and quantity of the purchased product included in the instruction data.

Thus, the customer can register products as purchased products by repeatedly specifying the start of scanning and having bar codes of products to be registered scanned by the user terminal 200 one after another.

Figure 19:
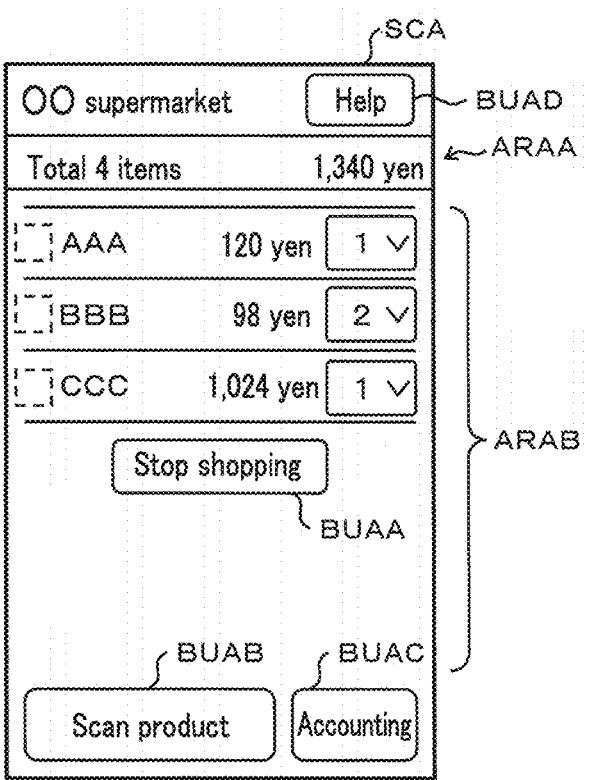
FIG. 19 is a diagram showing an example of a list screen in a state where a purchased product is registered.

FIG. 19 is a diagram showing an example of a list screen SCA that is presented to the customer, showing states of purchased products that have already been registered.

The list screen SCA shown in FIG. 19 is an example of a case in which one product with a product name "AAA" and a price of 120 yen, two products with a product name "BBB" and a price of 98 yen, and one product with a product name "CCC" and a price of 1,024 yen are already registered as purchased products. In the list screen SCA shown in FIG. 19, the display area ARAB represents the product name, price, and quantity for these registered products. The display area ARAA shows "4" as the total number and "1, 340" as the total amount. An area surrounded by a dashed line to the left of the product name represents an area for displaying an icon. The dashed line representing that area is not actually shown on the list screen SCA.

The camera 205 of the user terminal 200 is often not a reading device optimized for reading bar codes. Thus, the bar codes may be difficult to read sometimes. In addition, the bar codes may not be displayed on some products. When a customer wants to receive help from a store clerk, such as when he/she cannot successfully read a bar code with the user terminal 200, the customer specifies a help service by a predetermined operation such as touching the button BUAD on the list screen SCA.

If the help service is specified in this way, at the user terminal 200, the processor 201 determines YES in ACT 113 in FIG. 11, and proceeds to ACT 124.

As ACT 124, the processor 201 generates image data for a linkage screen to be displayed on the touch panel 204 so that the linkage screen is displayed on the touch panel 204.

Figure 20:
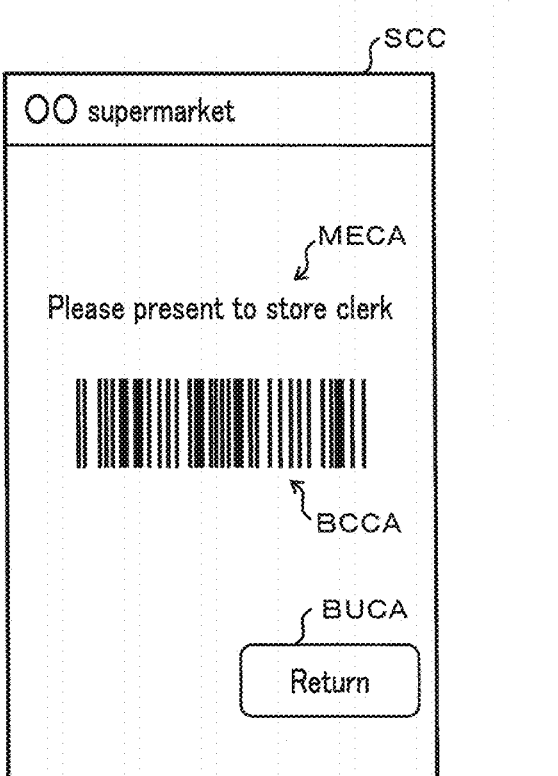
FIG. 20 is a diagram showing an example of a linkage screen.

FIG. 20 is a diagram showing an example of a linkage screen SCC to be presented to the customer.

The linkage screen SCC includes a message MECA, a bar code BCCA, and a button BUCA. The message MECA is a text message that prompts the customer to present the linkage screen SCC to a store clerk. The bar code BCCA represents bar code data containing the terminal code of the user terminal 200. The button BUCA is a soft key for the customer to specify that the display screen be returned to the list screen.

The customer approaches a store clerk and presents the linkage screen SCC. The linkage screen SCC is used to link a process of storing a content of a transaction being performed in response to a request from that customer's user terminal 200 to the clerk terminal 300. Upon presentation of the linkage screen SCC, the store clerk activates a linkage function of the clerk terminal 300.

When the linkage function is activated, the processor 302 at the clerk terminal 300 executes the clerk terminal application APEA and performs predetermined processing.

FIG. 21 is a flowchart of information processing performed by the processor 302 executing the clerk terminal application APEA.

As ACT 301, the processor 302 generates image data for a guidance screen to be displayed on the touch panel 305 so that the guidance screen is displayed on the touch panel 305. The guidance screen is a screen that prompts the store clerk to scan the bar code BCCA shown on the linkage screen SCC presented by the customer.

The store clerk follows the guidance screen and has the bar code BCCA shown on the linkage screen SCC presented by the customer scanned by the bar code scanner 301. When the bar code scanner 301 scans the bar code BCCA, the bar code scanner 301 notifies the processor 302 of bar code data that the bar code BCCA represents.

Note that once the bar code BCCA shown on the linkage screen SCC is scanned, the customer instructs return by a predetermined operation such as touching the button BUCA. Further, when the customer wishes to cancel the use of the help service, he/she instructs return without presenting the linkage screen SCC to the store clerk.

At the user terminal 200, the processor 201 proceeds to ACT 125 in FIG. 11 with the linkage screen SCC displayed.

As ACT 125, the processor 201 waits for a return instruction to be made. The processor 201 then determines YES if return is instructed as described above, returns to ACT 112, and performs the rest of the processes in the same manner as described above.

At the clerk terminal 300, the processor 302 displays the guidance screen on the touch panel in ACT 301 in FIG. 21, and then proceeds to ACT 302.

As ACT 302, the processor 302 waits for the terminal code of the user terminal 200 to be obtained. If the processor 302 is notified of the bar code data from the bar code scanner 301 as described above, the processor 302 determines YES and proceeds to ACT 303 because the terminal code of the user terminal 200 contained in this bar code data has been obtained.

As ACT 303, the processor 302 requests the mobile controller 3 to link to a process of storing a purchased product (a content of a transaction) that is being done in response to a request from the user terminal 200. Specifically, the processor 302 establishes wireless communication between the wireless communication unit 307 and the access point 6 according to a predetermined communication setting. The processor 302 then transmits request data for requesting linkage to the mobile controller 3 via the wireless communication with the access point 6. This request data is transmitted to the mobile controller 3 via the access point 6 and the in-store communication network 7. The processor 302 includes identification data for identifying that the request is a request for linkage and the terminal code of the user terminal 200 contained in the above bar code data in the request data for requesting linkage.

Various requests from the clerk terminal 300 to the mobile controller 3 to be described below are realized by sending request data containing identification data for identifying a reason for the request from the clerk terminal 300 to the mobile controller 3 via the access point 6 and the in-store communication network 7 in the same manner as described above.

When the request data for requesting linkage is received by the communication interface 34, the processor 31 at the mobile controller 3 executes the registration support application APCA and starts information processing (hereinafter referred to as linkage processing) to link the clerk terminal 300 to a registration process of a purchased product being conducted using the user terminal 200.

FIG. 22 is a flowchart of the linkage processing performed by the processor 31 executing the registration support application APCA.

The processor 31 starts that linkage processing each time request data for requesting linkage is received by the communication interface 34. In a case where linkage processing started based on a request from another clerk terminal has already been performed, the processor 31 starts new linkage processing in parallel therewith. That is, the processor 31 may perform multiple linkage processing in parallel, respectively targeting multiple clerk terminals 300. In the following description of the linkage processing, when simply denoting the "clerk terminal 300", it shall refer to the clerk terminal 300 that is the subject of the linkage processing being described.

As ACT 401, the processor 31 confirms whether or not a requester is the clerk terminal 300. The processor 31, for example, queries the store server 1 to determine whether or not a terminal identified by a terminal code of a sender of request data for requesting linkage is the clerk terminal 300. The store server 1 uses the inquired about terminal code to refer to a clerk terminal database, which is a part of the database group DBAA stored in the auxiliary storage unit 13 of the store server 1, to confirm whether or not that terminal code is a code of a terminal designated for store clerk use. If the inquired about terminal code is included in the clerk terminal database, the mobile controller 3 is notified that it is a clerk terminal 300, and if not, that it is not a clerk terminal 300. Accordingly, the processor 31 determines NO if it is notified by the store server 1 that it is not a clerk terminal 300, and proceeds to ACT 402.

As ACT 402, the processor 31 notifies the clerk terminal 300 of a refusal to link. The processor 31, for example, transmits notification data containing identification data for identifying that there is a refusal to link to the clerk terminal 300 via the in-store communication network 7 and the access point 6. The processor 31 then ends the linkage processing. In other words, in this case, the processor 31 does not link the clerk terminal 300 to the user terminal 200.

On the other hand, if the processor 31 is notified by the store server 1 that it is a clerk terminal 300, the processor 31 determines YES in ACT 401, and proceeds to ACT 403.

As ACT 403, the processor 31 updates the linkage database DBCB to store an association between the terminal code of the user terminal 200 and the terminal code of the clerk terminal 300 to indicate that the clerk terminal 300 is linked to a registration process for a purchased product using the user terminal 200 identified by the terminal code contained in the request data. The processor 31, for example, updates the linkage database DBCB to include a new data record DRB with the terminal code of the sender of the request data set in the field FBA and the terminal code contained in the request data set in the field FBB.

The clerk terminal 300 as the second terminal is thereby linked to the process of storing the purchased product (the content of the transaction), which is being conducted in response to the request from the user terminal 200 as the first terminal. Thus, by the processor 31 executing information processing based on the registration support application APCA, the computer (mobile controller 3) with the processor 31 as the central part functions as a linkage unit.

As ACT 404, the processor 31 instructs the clerk terminal 300 to display a registration status screen. The processor 31, for example, transmits instruction data containing identification data for identifying that the instruction is an instruction to display the registration status screen to the clerk terminal 300 via the in-store communication network 7 and the access point 6. The processor 31 includes the product code, product name, price, and quantity contained in the data record DRC, which is stored in the registration database DBCC in association with the transaction related to the user terminal 200, in the instruction data for the clerk terminal 300.

At the clerk terminal 300, the processor 302 requests the linkage in ACT 303 in FIG. 21, and then proceeds to ACT 304.

As ACT 304, the processor 302 confirms whether or not display of a registration status screen is instructed. The processor 302 then determines NO if the corresponding specification is not confirmed, and proceeds to ACT 305.

As ACT 305, the processor 302 confirms whether or not it is notified of a refusal to link. The processor 302 then determines NO if the corresponding notification is not confirmed, and returns to ACT 304.

Thus, as ACT 304 and ACT 305, the processor 302 waits for either an instruction to display a registration status screen or a refusal notification to be made.

If notification data for a refusal notification is received at the wireless communication unit 307, the processor 302 determines YES in ACT 305, and proceeds to ACT 306.

As ACT 306, the processor 302 displays an error screen on the touch panel 305. The error screen is a screen for informing the store clerk that the terminal cannot be linked. The processor 302 then waits for the store clerk to declare that he/she has confirmed the notification on the error screen, or waits for the end of a predetermined error screen display period, and then ends the information processing shown in FIG. 21.

When the instruction data instructing the display of the registration status screen is received at the wireless communication unit 307, the processor 302 determines YES in ACT 304, and proceeds to ACT 307.

As ACT 307, the processor 302 generates image data for the registration status screen to be displayed on the touch panel 204 so that the registration status screen is displayed on the touch panel 204. At this time, the processor 302 makes the registration status screen a screen showing the product name, price, and quantity of the purchased product contained in the instruction data.

Thus, the store clerk can confirm the registration status of the purchased product at the linked user terminal 200 by visually inspecting the registration status screen displayed on the touch panel 204. The store clerk then performs a predetermined operation for specifying a product that the customer wishes to register as a purchased product upon request from the customer. This operation is, for example, an operation for having the bar code scanner 301 scan a bar code representing a product code of that product. This operation may be an operation of entering a product code on the touch panel, etc.

As ACT 308, the processor 302 confirms whether or not the product code is obtained. The processor 302 then determines NO if the product code is not obtained, and proceeds to ACT 309.

As ACT 309, the processor 302 confirms whether or not release of the linkage is instructed. The processor 302 then determines NO if the corresponding instruction is not confirmed, and returns to ACT 308.

Thus, as ACT 308 and ACT 309, the processor 302 waits for the product code to be obtained or the release to be instructed.

If an operation for specifying a product is performed as described above, the processor 302 will obtain the product code according to that operation. Thus, the processor 302 determines YES in ACT 308, and proceeds to ACT 310.

As ACT 310, the processor 302 requests the mobile controller 3 to register the product. The processor 302 includes the obtained product code in request data to be transmitted here.

At the mobile controller 3, the processor 31 instructs the display of the registration status screen in ACT 404 in FIG. 22, and then proceeds to ACT 405.

As ACT 405, the processor 31 confirms whether or not the product registration is requested. The processor 31 then determines NO if the corresponding request is not confirmed, and proceeds to ACT 406.

As ACT 406, the processor 31 confirms whether or not release of the linkage is requested. The processor 31 then determines NO if the corresponding request is not confirmed, and returns to ACT 405.

Thus, the processor 31 waits for the registration or release to be requested as ACT 405 and ACT 406. If the registration is requested by the clerk terminal 300 as described above, the processor 31 determines YES in ACT 405, and proceeds to ACT 407.

As ACT 407, the processor 31 transfers the request for product registration as request data to the virtual POS server 2. At this time, the processor 31 adds to the request data a transaction code of the transaction that is the subject of the transaction processing being performed with respect to the user terminal 200 to which the clerk terminal 300 is linked. The processor 31, for example, searches for a data record DRB in which the terminal code of the requesting clerk terminal 300 is set in the field FBA from the linkage database DBCB stored in the auxiliary storage unit 33, and obtains the terminal code of the user terminal 200 set in the field FBB of the corresponding data record DRB. The processor 31 then searches the transaction management database DBCA stored in the auxiliary storage unit 33 for a data record DRA in which the obtained terminal code of the user terminal 200 is set in the field FAA, and obtains the transaction code set in the field FAC of the corresponding data record DRA. The processor 31 then adds the obtained transaction code to the request data to be transferred to the virtual POS server 2.

The processor 21 at the virtual POS server 2 registers the product code contained in the request data sent from the mobile controller 3 as a purchased product for a transaction identified by the transaction code contained in that request data in the transaction database DBBA stored in the auxiliary storage unit 23. The processor 21 then transmits result data representing a result of such processing to the mobile controller 3 as in ACT 212.

Thus, through the transfer of the registration request from the clerk terminal 300 by the processor 31 of the mobile controller 3 and the registration process of the purchased product by the processor 21 of the virtual POS server 2 based on this registration request, the product specified by the clerk terminal 300 (second terminal) is stored in the transaction database DBBA in the auxiliary storage unit 23 of the virtual POS server as a product to be purchased by the customer who is a user of the user terminal 200. Thus, by the processor 21 executing the virtual POS application APBA and the processor 31 executing the registration support application APCA, a function as a second registration unit is realized by the computer (virtual POS server 2) with the processor 21 as the central part and the computer (mobile controller 3) with the processor 31 as the central part.

The processor 31 of the mobile controller 3 requests the registration in ACT 407, and then proceeds to ACT 408.

As ACT 408, the processor 31 obtains the result data transmitted from the virtual POS server as described above. The processor 31 stores the obtained result data in the main memory 32 or the auxiliary storage unit 33.

As ACT 409, the processor 31 updates the registration database DBCC in the same manner as described above based on the above result data.

As ACT 410, the processor 31 instructs the user terminal 200 to which the clerk terminal 300 is linked to display a list screen. The processor 31 includes the product code, product name, price, and quantity contained in the data record DRC associated with the transaction being processed in the registration database DBCC in instruction data for this display instruction.

The processor 31 then returns to ACT 404, and the processes thereafter are repeated in the same manner as described above. That is, at this time, the processor 31 instructs the clerk terminal 300 to display the registration status screen showing the product code, product name, price, and quantity contained in the updated data record DRB associated with the transaction being processed in the registration database DBCC.

At the user terminal 200, the processor 201 determines YES in ACT 118 in FIG. 11 if the display of the list screen is instructed by the mobile controller 3 as described above, returns to ACT 112, and repeats the processes thereafter in the same manner as described above. That is, at this time, the processor 201 instructs the user terminal 200 to display a list screen showing the product code, product name, price, and quantity contained in the updated data record DRB associated with the transaction being processed in the registration database DBCC. Accordingly, the list screen SCA displayed thereby reflects a result of the registration according to the operation at the clerk terminal 300.

At the clerk terminal 300, the processor 302 requests the registration of the product in ACT 310 in FIG. 21, and then proceeds to ACT 311.

As ACT 311, processor 302 waits for display of the registration status screen to be instructed. The processor 302 then judges YES if the display of the registration status screen is instructed by the mobile controller 3 as described above, and returns to ACT 307 to generate image data for the registration status screen to be displayed on the touch panel 305 so that the registration status screen is again displayed on the touch panel 305.

As described above, the operation by the store clerk at the clerk terminal 300 registers the purchased product related to the transaction that is the subject of the transaction processing related to the user terminal 200 to which the clerk terminal 300 is linked.

When the store clerk finishes registering all the products requested by the customer as purchased products, he/she instructs release of the linkage by a predetermined operation such as touching a button shown on the registration status screen.

If the release of the linkage is instructed as described above, the processor 302 determines YES in ACT 309, and proceeds to ACT 312.

As ACT 312, the processor 302 requests the mobile controller 3 to release the linkage.

As ACT 313, the processor 302 waits for a release notification.

At the mobile controller 3, the processor 31 determines YES in ACT 406 in FIG. 22 if the release of the linkage is requested, and proceeds to ACT 411.

As ACT 411, the processor 31 updates the linkage database DBCB to release the linkage with the user terminal 200 relating to the requesting clerk terminal 300. The processor 31, for example, deletes from the linkage database DBCB the data record DRB with the terminal code of the requesting clerk terminal 300 set in the field FBA.

As ACT 412, the processor 31 notifies the clerk terminal 300 of the release of the linkage. The processor 31 then ends the linkage processing.

At the clerk terminal 300, the processor 302 determines YES in ACT 313 in FIG. 21 if it is notified of the release of the linkage from the mobile controller 3 as described above, and ends the information processing shown in FIG. 21.

When the customer touches an area showing the quantity on the list screen SCA, the processor 201 generates image data for displaying a list box for specifying the quantity by overlaying the list box on the list screen SCA so that the list box for specifying the quantity is displayed in a manner overlaid on the list screen SCA. When this list box is operated, the processor 201 receives this as specification of the quantity. In this case, the processor 201 then determines YES in ACT 115 in FIG. 11, and proceeds to ACT 126 in FIG. 12.

As ACT 126, the processor 201 confirms whether or not the specified number is 0. The processor 201 then determines NO if the specified number is not 0, and proceeds to ACT 127.

As ACT 127, the processor 201 requests a quantity change to the mobile controller 3. The processor 201 includes specification data for specifying a product for which the quantity is specified and the specified number in request data to be transmitted here. The specification data may be a product code or data that allows only the mobile controller 3 to specify a purchased product such as a number for identifying each purchased product in a list of purchased products. If a product code is used as specification data, the processor 31 includes a product code related to each purchased product in the instruction data for instructing the display of the list screen.

At the mobile controller 3, the processor 31 determines YES in ACT 206 in FIG. 14 if the quantity change is requested from the user terminal 200 as described above, and proceeds to ACT 214 in FIG. 15.

As ACT 214, the processor 31 transfers the quantity change request to the virtual POS server 2 along with notification of the transaction code. At this time, the processor 31 may add the transaction code to the request data sent from the user terminal 200 and transfer it to the virtual POS server 2, or add the transaction code to request data after conversion by some processing and transmit it to the virtual POS server 2. However, the processor 31 notifies the virtual POS server 2 of the quantity contained in the request data sent from the user terminal 200. If the specification data contained in the request data is not the product code, the processor 31 replaces that specification data with the product code.

The processor 21 at the virtual POS server 2 assumes that the quantity contained in the request data sent from the mobile controller 3 is input by an input device provided in an existing POS terminal, and changes the quantity of a purchased product through the same process as that of the existing POS terminal. The processor 21 transmits the product code of the product whose quantity has been changed and result data showing a quantity after change to the mobile controller 3.

The processor 31 at the mobile controller 3 transfers the quantity change request in ACT 214, and then proceeds to ACT 215.

As ACT 215, the processor 31 obtains the result data transmitted from the virtual POS server 2 as described above. The processor 31 stores the obtained result data in the main memory 32 or the auxiliary storage unit 33.

As ACT 216, the processor 31 updates the registration database DBCC based on the above result data. That is, the processor 31 finds registration data containing the reported product code from an associated data record DRC. The processor 31 then rewrites the quantity contained in the corresponding registration data to a quantity contained in the result data.

Note that the processor 31 may store the specification data and the quantity sent in the quantity change request data in the main memory 32 or the auxiliary storage unit 33, and rewrite a quantity of registration data related to a product specified by this stored specification data to the stored quantity in response to receiving result data indicating that the update is complete. In this case, the processor 21 in the virtual POS server 2 may not include the product code and the quantity in the result data.

As ACT 217, the processor 31 instructs the user terminal 200 to display a list screen. The processor 31 includes a product code, product name, price, and quantity contained in registration data whose cancellation flag is "O" among registration data contained in the data record DRC updated as described above in instruction data. After that, the processor 31 returns to the waiting state of ACT 205 through ACT 209 in FIG. 14.

Figure 12:
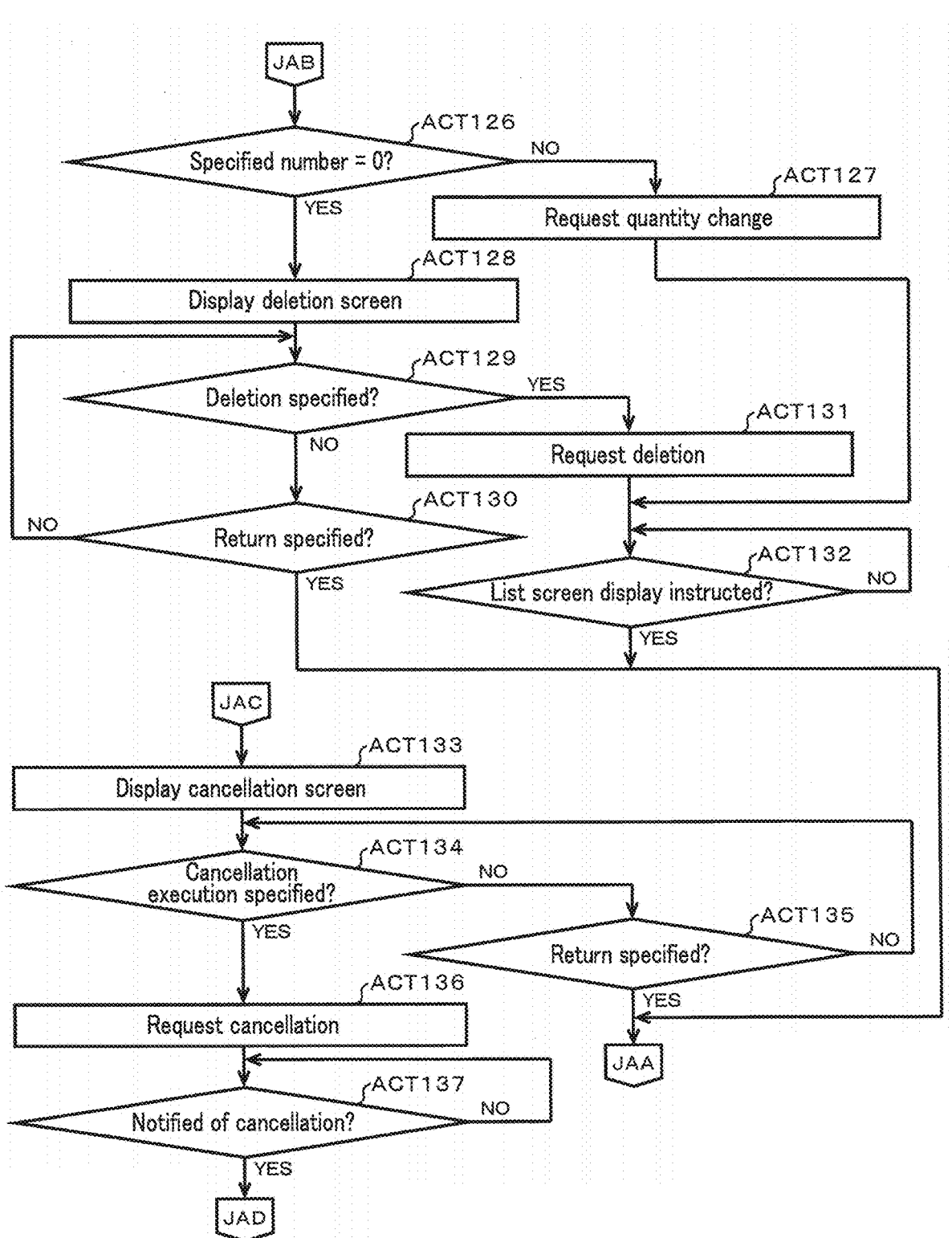
FIG. 12 is a flowchart of information processing performed by the processor shown in FIG. 8.

Now, if the specified number is 0, the processor 201 at the user terminal 200 determines YES in ACT 126 in FIG. 12, and proceeds to ACT 128.

As ACT 128, the processor 201 generates image data for a deletion screen to be displayed on the touch panel 204 so that the deletion screen is displayed on the touch panel 204. The deletion screen is a screen to inform the customer that a product whose quantity is specified to be 0 will be deleted from the purchased products. The deletion screen includes a deletion button for specifying deletion and a return button for specifying return to a state prior to specifying the quantity change without changing the quantity.

As ACT 129, the processor 201 confirms whether or not deletion is specified. The processor 201 then determines NO if the corresponding specification is not confirmed, and proceeds to ACT 130.

As ACT 130, the processor 201 confirms whether or not return is specified. The processor 201 then determines NO if the corresponding specification is not confirmed, and returns to ACT 129.

Thus, the processor 201 waits for the deletion or return to be specified as ACT 129 and ACT 130.

If the customer wishes to cancel the deletion and return to the state prior to specifying the quantity change, he/she specifies return by a predetermined operation such as touching the return button on the deletion screen. In response, the processor 201 determines YES in ACT 130 and returns to ACT 112 in FIG. 11, and displays the list screen SCA again on the touch panel 204. In this case, the registration status of the purchased product is not changed, so the processor 201 displays the list screen SCA in the same state as it was displayed prior to displaying the deletion screen again on the touch panel 204.

If the customer is sure about deletion, he/she specifies the deletion by a predetermined operation such as touching the deletion button on the deletion screen. In response, the processor 201 determines YES in ACT 129, and proceeds to ACT 131.

As ACT 131, the processor 201 requests the deletion to the mobile controller 3. The processor 201 includes specification data for specifying a product for which the deletion is specified in request data to be transmitted here.

At the mobile controller 3, the processor 31 determines YES in ACT 207 in FIG. 14 if the deletion is requested from the user terminal 200 as described above, and proceeds to ACT 218 in FIG. 15.

As ACT 218, the processor 31 transfers the deletion request to the virtual POS server 2 along with the notification of the transaction code. At this time, the processor 31 may add the transaction code to the request data sent from the user terminal 200 and transfer it to the virtual POS server 2, or add the transaction code to request data after conversion by some processing and transmit it to the virtual POS server 2. If the specification data contained in the request data is not the product code, the processor 31 replaces that specification data with the product code.

The processor 21 at the virtual POS server 2 assumes that the request by the request data sent from the mobile controller 3 is a deletion instruction that is input by the input device provided in the existing POS terminal, and excludes a target product from the purchased products registered in the transaction database DBBA stored in the auxiliary storage unit 23 through the same process as that of the existing POS terminal. The processor 21 transmits result data showing a product code of the product excluded from the purchased products to the mobile controller 3.

The processor 31 at the mobile controller 3 transfers the request for deletion in ACT 218, and then proceeds to ACT 219.

As ACT 219, the processor 31 obtains the result data transmitted from the virtual POS server 2 as described above. The processor 31 stores the obtained result data in the main memory 32 or the auxiliary storage unit 33.

As ACT 220, the processor 31 updates the registration database DBCC based on the above result data. That is, the processor 31 finds registration data containing the reported product code from the data record DRC associated with the transaction code. The processor 31 then changes the cancellation flag in the corresponding registration data to "1".

The processor 31 may store specification data sent with the deletion request data in the main memory 32 or the auxiliary storage unit 33, and change a cancellation flag of registration data of a product identified by this stored specification data in response to receiving result data indicating that the deletion is complete. And in this case, at the virtual POS server 2, the processor 21 does not have to include the product code in the result data.

As ACT 221, the processor 31 instructs the user terminal 200 to display the list screen SCA. The processor 31 includes a product code, a product name, a price, and a quantity contained in registration data whose cancellation flag is "0" in the registration data included in the data record DRC updated as described above in display instruction data. After that, the processor 31 returns to the waiting state of ACT 205 through ACT 209 in FIG. 14.

Now, at the user terminal 200, the processor 201 requests the quantity change in ACT 127 or the deletion in ACT 131 in FIG. 12, and then proceeds to ACT 132.

As ACT 132, the processor 201 waits for display of the list screen SCA to be instructed. The processor 201 then determines YES if the display of the list screen SCA is instructed from the mobile controller 3 as described above in response to the request for quantity change or in response to the request for deletion, and returns to ACT 112 in FIG. 11 to generate image data for the list screen SCA to be displayed on the touch panel 204 so that the list screen SCA is again displayed on the touch panel 204. At this time, the processor 201 makes the list screen SCA a screen showing the product name, price, and quantity of the purchased product included in the instruction data. In this case, since the registration status of the purchased product is changed, the processor 201 generates image data for the list screen SCA so that a list screen SCA in a state of showing a purchased product different from the product that was displayed when the quantity change or deletion is specified is displayed on the touch panel 204.

If the customer wishes to cancel all of the purchased products already registered and stop shopping, the customer specifies the stopping by a predetermined operation such as touching the button BUAA on the list screen SCA. In response, the processor 201 determines YES in ACT 116 in FIG. 11, and proceeds to ACT 133 in FIG. 12.

As ACT 133, the processor 201 generates image data for a cancellation screen to be displayed on the touch panel 204 so that the cancellation screen is displayed on the touch panel 204. The cancellation screen is a screen that informs the customer that all purchased products already registered will be canceled. The cancellation screen includes an execution button for specifying cancellation execution and a return button for specifying to return to a state prior to specifying change in quantity without changing the quantity.

As ACT 134, the processor 201 confirms whether or not cancellation execution is specified. The processor 201 then determines NO if the corresponding specification is not confirmed, and proceeds to ACT 135.

As ACT 135, the processor 201 confirms whether or not a return is specified. The processor 201 then determines NO if the corresponding specification is not confirmed, and returns to ACT 134.

Thus, the processor 201 waits for the cancellation execution or return to be specified as ACT 134 and ACT 135.

If the customer wishes to continue shopping, he/she specifies the return by a predetermined operation such as touching the return button on the cancellation screen. In response, the processor 201 determines YES in ACT 135 and returns to ACT 112 in FIG. 11 to display the list screen SCA on the touch panel 204 again. In this case, the registration status of the purchased product is not changed, so the processor 201 displays again on the touch panel 204 the list screen SCA in the same state as it was displayed prior to displaying the cancellation screen.

If the customer wants to cancel the purchase, he/she specifies the cancellation execution of the transaction by a predetermined operation such as touching the execution button on the cancellation screen. In response, the processor 201 determines YES in ACT 134, and proceeds to ACT 136.

As ACT 136, the processor 201 requests the mobile controller 3 to cancel the transaction.

At the mobile controller 3, if the transaction cancellation is requested from the user terminal 200 as described above, the processor 31 determines YES in ACT 208 in FIG. 14, and proceeds to ACT 222 in FIG. 15.

As ACT 222, the processor 31 notifies the virtual POS server of the transaction code, and transfers the request for transaction cancellation (request data) to the virtual POS server 2. At this time, the processor 31 may add the transaction code to the request data and transfer it to the virtual POS server 2, or add the transaction code to request data after conversion by some processing and send it to the virtual POS server 2.

In the virtual POS server 2, the processor 21 assumes that the request by the request data sent from the mobile controller 3 is a cancellation instruction entered by the input device provided in the existing POS terminal, and deletes all of the purchased products registered in association with the reported transaction code in the transaction database DBBA stored in the auxiliary storage unit 23 by the same process as for the existing POS terminal. The processor 21 sends result data, indicating that the cancellation is complete, to the mobile controller 3.

The processor 31 at the mobile controller 3 transfers the request for transaction cancellation in ACT 222, and then proceeds to ACT 223.

As ACT 223, the processor 31 obtains the result data transmitted from the virtual POS server as described above. The processor 31 stores the obtained result data in the main memory 32 or the auxiliary storage unit 33.

As ACT 224, the processor 31 updates the registration database DBCC based on the above result data. That is, the processor 31 changes the cancellation flag "0" to "1" for all the registration data included in the data record DRC associated with the transaction being processed.

As ACT 225, the processor 31 notifies the user terminal 200 of the cancellation. The processor 31 then returns to the waiting state of ACT 205 through ACT 209 in FIG. 14.

Now, at the user terminal 200, the processor 201 requests the cancellation in ACT 136 in FIG. 12, and then proceeds to ACT 137.

In ACT 137, the processor 201 waits to be notified of the cancellation from the mobile controller 3. The processor 201 then determines YES if it is notified of the cancellation as described above, and returns to ACT 101 in FIG. 10.

When the customer finishes registering all of the products he/she wishes to purchase as purchased products, he/she proceeds to payment. At this time, the customer specifies a start of accounting by a predetermined operation such as touching the button BUAC on the list screen SCA. In response, the processor 201 determines YES in ACT 117 in FIG. 11, and proceeds to ACT 138 in FIG. 13.

As ACT 138, the processor 201 requests an accounting to the mobile controller 3.

At the mobile controller 3, if the accounting request is received from the user terminal 200 as described above, the processor 31 determines YES in ACT 209 in FIG. 14, and proceeds to ACT 226 in FIG. 16.

As ACT 226, the processor 31 instructs the user terminal 200 to display an accounting screen.

Figure 13:
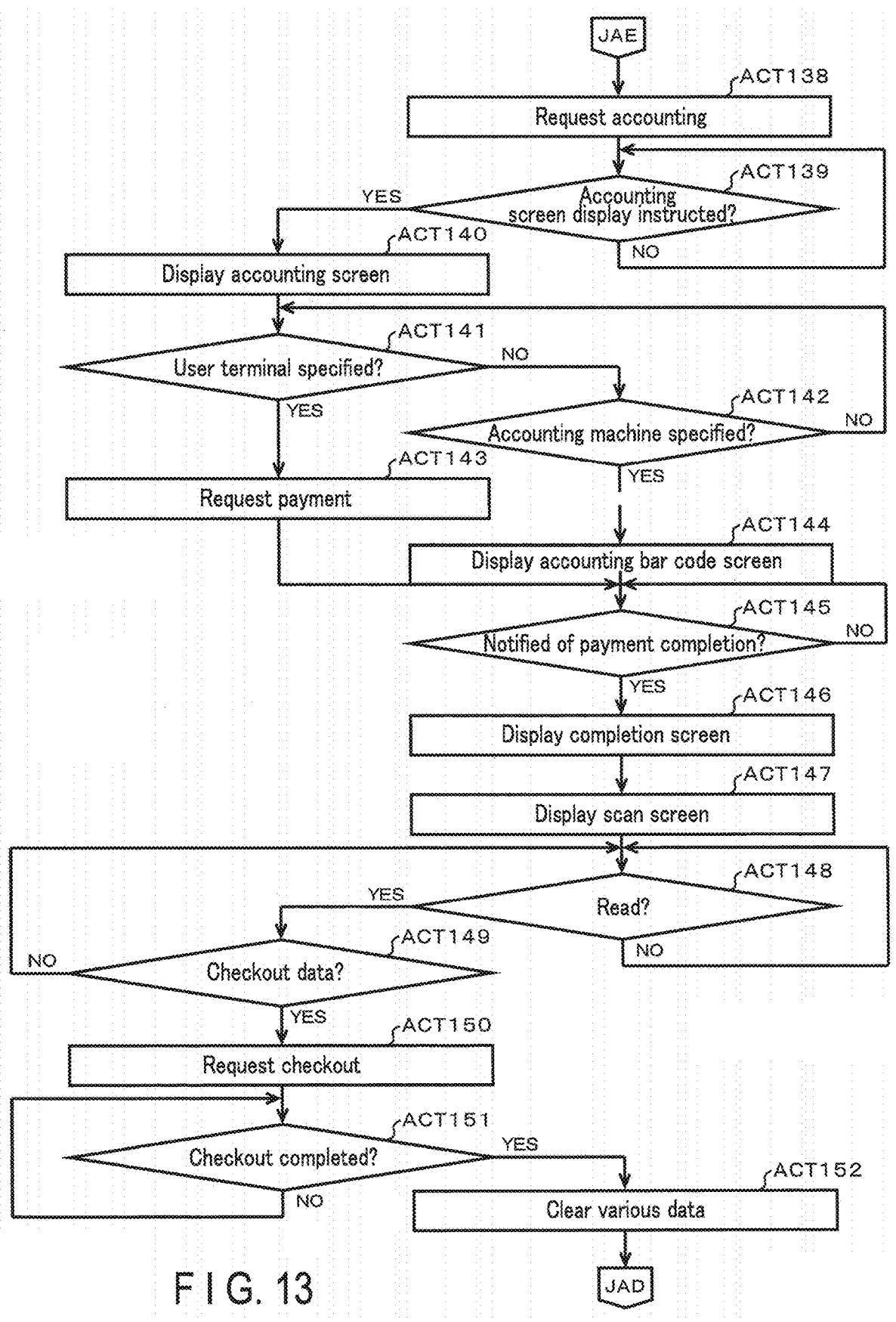
FIG. 13 is a flowchart of information processing performed by the processor shown in FIG. 8.

Now, at the user terminal 200, the processor 201 makes an accounting request in ACT 138 in FIG. 13, and then proceeds to ACT 139.

As ACT 139, the processor 201 waits for an instruction to display the accounting screen. If it is confirmed that display of the accounting screen is instructed as described above, the processor 201 determines YES in ACT 139, and proceeds to ACT 140.

As ACT 140, the processor 201 generates image data for the accounting screen to be displayed on the touch panel 204 so that the accounting screen is displayed on the touch panel 204. The accounting screen is a screen for the customer to select whether an operation for payment is performed at the user terminal 200 or the accounting machine 5.

When the customer wishes to perform the operation for payment at the user terminal 200, he/she specifies the user terminal 200 by a predetermined operation. If the customer wishes to perform the operation for payment at the accounting machine 5, he/she specifies the accounting machine 5 by a predetermined operation.

As ACT 141, the processor 201 confirms whether or not the user terminal 200 is specified. The processor 201 then determines NO if that specification is not confirmed, and proceeds to ACT 142.

As ACT 142, the processor 201 confirms whether or not the accounting machine 5 is specified. The processor 201 then determines NO if that specification is not confirmed, and returns to ACT 141.

Thus, the processor 201 waits for the user terminal 200 or the accounting machine 5 to be specified as ACT 141 and ACT 142. The processor 201 then determines YES in ACT 141 if the user terminal 200 is specified as described above, and proceeds to ACT 143.

As ACT 143, the processor 201 requests payment to the mobile controller 3. The processor 201 includes payment data, such as a credit card number or a user code for online payment service, which is necessary for the payment, in request data for requesting the payment.

If the accounting machine 5 is specified as described above, the processor 201 determines YES in ACT 142, and proceeds to ACT 144.

As ACT 144, the processor 201 generates image data for an accounting bar code screen to be displayed on the touch panel 204 so that the accounting bar code screen is displayed on the touch panel 204. The accounting bar code screen is a screen that shows an accounting bar code, which represents data necessary for the accounting machine 5 to obtain data (hereinafter referred to as accounting data) related to a content of a transaction from the virtual POS server 2. Although illustration of a detailed process is omitted, the processor 201 obtains the accounting bar code from the virtual POS server 2 via the mobile controller 3 and shows that accounting bar code on the accounting bar code screen.

The customer has a scanner included in the accounting machine 5, which is not in use by other customers, read the accounting bar code. In response, the accounting machine 5 obtains accounting data from the virtual POS server 2 according to data represented by the accounting bar code, and executes a process for paying a payment amount determined based on this accounting data. If the payment is completed, the accounting machine 5 then notifies the virtual POS server 2 of the payment completion. At the virtual POS server 2, if it is notified of the payment completion by the accounting machine 5, the processor 21 notifies the mobile controller 3 of the payment completion. The payment completion at the accounting machine 5 may be reported directly from the accounting machine 5 to the mobile controller 3.

At the mobile controller 3, the processor 31 instructs the display of the accounting screen in ACT 226 in FIG. 16, and then proceeds to ACT 227.

As ACT 227, the processor 31 confirms whether or not payment is requested by the user terminal 200. The processor 31 then determines NO if that request is not confirmed, and proceeds to ACT 228.

As ACT 228, the processor 31 confirms whether or not it is notified of a payment completion. The processor 31 then determines NO if that notification is not confirmed, and returns to ACT 227.

Thus, the processor 31 waits for the payment request or payment completion notification as ACT 227 and ACT 228. Then, the processor 31 determines YES in ACT 227 if the payment is requested by the user terminal 200 as described above, and proceeds to ACT 229.

As ACT 229, the processor 31 transfers the payment request to the virtual POS server 2 along with notification of the transaction code of the transaction being processed. At this time, the processor 31 may transfer the request data sent from the user terminal 200 to the virtual POS server 2 as it is, or transmit request data after conversion by some processing to the virtual POS server 2.

At the virtual POS server 2, the processor 21 assumes that the request by the request data sent from the mobile controller 3 is a payment instruction input by an input device provided in an existing POS terminal, and calculates a price for the transaction identified by the reported transaction code and performs a process for paying this based on payment data, using the same processing as for the existing POS terminal. The process for payment includes, for example, a payment request to a payment server (not shown). The processor 21 then transmits result data, indicating that the payment has been completed, to the mobile controller 3.

At the mobile controller 3, the processor 31 transfers the payment request in ACT 229, and then proceeds to ACT 230.

As ACT 230, the processor 31 waits to be notified of payment completion from the virtual POS server 2. The processor 31 then determines YES if the result data transmitted by the virtual POS server 2, indicating that the payment has been completed, is received by the communication interface 34, as described above, and proceeds to ACT 231. If it is notified of the payment completion at the accounting machine 5 as described above, the processor 31 determines YES in ACT 228, and proceeds to ACT 231.

As ACT 231, the processor 31 notifies the user terminal 200 of the payment completion.

At the user terminal 200, the processor 201 requests the payment to the mobile controller 3 in ACT 143 in FIG. 13 or displays the accounting bar code screen in ACT 144, and then proceeds to ACT 145.

As ACT 145, the processor 201 waits to be notified of the payment completion. The processor 201 then determines YES if it is notified of the payment completion from the mobile controller 3 as described above, and proceeds to ACT 146.

As ACT 146, the processor 201 generates image data for a completion screen to be displayed on the touch panel 204 so that the completion screen is displayed on the touch panel 204. The completion screen is a screen for informing the customer that the payment has been completed.

Once the customer confirms the completion screen, he/she declares that he/she has confirmed it by a predetermined operation such as touching a button shown on the completion screen. In response, the processor 201 proceeds to ACT 147. The processor 201 may proceed to ACT 147 when an elapsed time with the completion screen displayed reaches a predetermined time.

As ACT 147, the processor 201 generates image data for a scan screen for checkout to be displayed on the touch panel 204 so that the scan screen for checkout is displayed on the touch panel 204. The scan screen for checkout is a screen for reading a two-dimensional code TCO for checkout. The processor 201, for example, activates the camera 205, and generates a scanning screen in which an image obtained by the camera 205 is overlaid with a text message urging the customer to read the two-dimensional code TCO and a line indicating an approximate position over which the two-dimensional code TCO should be held.

Once the scan screen for checkout is displayed on the touch panel 204, the customer points the camera 205 at the two-dimensional code TCO so that the two-dimensional code TCO posted near the store exit appears on the scan screen.

As ACT 148, the processor 201 waits for the two-dimensional code to be read. At this time, the processor 201 repeatedly analyzes the image obtained by the camera 205 and attempts to read the two-dimensional code. This reading of the two-dimensional code may be performed as a process based on the smartphone POS application APDA, or as a process based on another application program for reading two-dimensional codes. The processor 201 then determines YES if the two-dimensional code is read, and proceeds to ACT 149.

As ACT 149, the processor 201 confirms whether or not data represented by the read two-dimensional code is checkout data. The processor 201 then determines NO if it is not checkout data and returns to ACT 148. At this time, the processor 201 may display on the touch panel 204 a screen for informing the customer that an incorrect two-dimensional code has been read.

If it is confirmed that the data represented by the read two-dimensional code is checkout data, the processor 201 determines YES in ACT 149, and proceeds to ACT 150.

As ACT 150, the processor 201 requests checkout to the mobile controller 3.

At the mobile controller 3, the processor 31 makes the notification of the payment completion in ACT 231 in FIG. 16, and then proceeds to ACT 232.

As ACT 232, the processor 31 waits for a checkout to be requested. The processor 31 then determines YES if the checkout is requested by the user terminal 200 as described above, and proceeds to ACT 233.

As ACT 233, the processor 31 performs a checkout process. The checkout process is a process of clearing data stored in the main memory 32 and the auxiliary storage unit 33 for management of a transaction that was subject to processing, etc. The virtual POS server 2 may end the processing related to the corresponding transaction in response to the completion of the payment, or end the processing related to the transaction in response to an instruction from the mobile controller 3. In the latter case, the processor 31 then gives the above instruction to the virtual POS server 2 in the checkout process. Further, a history database representing a history of user operations, including erroneous bar code scanning, etc., may be managed by the store server 1, the virtual POS server 2, or the mobile controller 3, or another server (not shown), etc. In this case, the processor 31 performs a process for updating the history database so as to reflect a history of operations related to the current transaction in the checkout process.

As ACT 234, the processor 31 notifies the user terminal 200 of a completion of checkout. The processor 31 then ends the information processing shown in FIGS. 14 through 16.

At the user terminal 200, the processor 201 requests the checkout in ACT 150 in FIG. 13, and then proceeds to ACT 151.

As ACT 151, the processor 201 waits for a notification of checkout completion. The processor 201 then determines YES if it is notified of the checkout completion from the mobile controller 3 as described above, and proceeds to ACT 152.

As ACT 152, the processor 201 clears various data for temporary use with respect to the current shopping, such as the check-in data stored in ACT 107 in FIG. 10, for example. The processor 201 then returns to ACT 101 in FIG. 10.

As described above, according to the present embodiment, the clerk terminal 300 can be temporarily linked to the process of registering a purchased product by a customer using the user terminal 200, and the previous registration process using the user terminal 200 can be continued as a registration process of the purchased product in response to a request from the clerk terminal 300 operated by a store clerk, without stopping the product registration process being conducted using the user terminal 200.

It is also possible for a store clerk to perform operations related to registration of a purchased product on behalf of a customer by the store clerk operating the user terminal 200. However, since the user terminal 200 is a property of the customer, it is undesirable for the store clerk to operate the user terminal 200 in light of issues such as customer privacy protection, erasure of data in the user terminal 200 due to mishandling, and equipment damage. In contrast, in the present embodiment, a store clerk does not operate the user terminal 200, and the only information passed from the user terminal 200 to the clerk terminal 300 is the terminal code of the user terminal 200, so there is no need for the store clerk to operate the user terminal 200 and no opportunity for the store clerk to access information stored on the user terminal 200. In situations where it is difficult to register a product from the user terminal 200 due to the performance of the camera 205 of the user terminal 200, for example, it remains difficult to register the product even if a store clerk operates the user terminal 200. In the present embodiment, product registration can be performed using the clerk terminal 300 having the bar code scanner 301 suitably configured to optically read bar codes representing product codes, thus eliminating the aforementioned difficulty in registering products using the user terminal 200.

Further, according to the linkage function of the present embodiment, security of the store system 100 against customers is also protected because information generated inside the store system 100, such as transaction codes, is not sent to the user terminal 200 or the clerk terminal 300.

According to the present embodiment, a "terminal code of user terminal" and a "transaction code" are associated and stored in the transaction management database DBCA in the auxiliary storage unit 33 of the mobile controller 3, and the "transaction code" and a "product code to be purchased" are associated and stored in the transaction database DBBA in the auxiliary storage unit 23 of the virtual POS server 2. A registration request for a purchased product from the user terminal 200 is processed using the transaction management database DBCA and the transaction database DBBA. When a customer needs to temporarily receive store clerk assistance while shopping around in a store, the "terminal code of user terminal" and a "terminal code of clerk terminal" are associated and stored in the linkage database DBCB in the auxiliary storage unit 33 of the mobile controller 3 in response to a request from the clerk terminal 300 operated by a store clerk from whom the customer requested assistance. The mobile controller 3 can obtain the "user terminal code" of the customer who is shopping from the "clerk terminal code" of the clerk terminal 300 simply by referring to the linkage database DBCB. Therefore, with only a slight change in the internal configuration of the transaction processing device, namely the addition of the linkage database DBCB, the mobile controller 3 and the virtual POS server 2 can continue to process the product registration request from the clerk terminal 200 without stopping the product registration process in response to the request from the user terminal 200. In addition, since the de-linking of the clerk terminal 300 does not affect the contents of the transaction management database DBCA and the transaction database DBBA, the previous product registration process using the user terminal 200 can continue. This means that customers can receive temporary assistance from a store clerk at any time while they are shopping around the store.

For example, if product registration assistance is provided by a store clerk stationed at an accounting counter, a customer must carry around a product that has not yet been registered as a purchased product. In addition, when adding a product that has not yet been registered to a shopping cart, it becomes cumbersome to distinguish it from products that have already been registered. According to the present embodiment, these hassles do not arise.

This embodiment can be implemented with various modifications as follows.

The clerk terminal 300 may be equipped with a camera and process an image acquired by capturing a bar code with that camera to obtain bar code data. If image processing for obtaining bar code data is suitably defined for reading product codes, the accuracy of reading product codes can be improved as compared to generic image processing that reads various bar codes different from those that represent product codes. In many cases, an operation for specifying a product at the clerk terminal 300 can be performed promptly by a store clerk, even if it is somewhat cumbersome. Therefore, it is not essential that the clerk terminal 300 be equipped with a function that allows product specification more simply than the user terminal 200.

Linking the clerk terminal 300 to the user terminal 200 may be done by displaying a bar code representing the terminal code of the clerk terminal 300 on the touch panel 305 of the clerk terminal 300, etc., and reading this bar code with the user terminal 200 to obtain the terminal code of the clerk terminal 300 at the user terminal 200. In this case, a linkage request and the terminal code of the clerk terminal 300 are sent from the user terminal 200 to the mobile controller 3. The mobile controller 3 stores the "terminal code of user terminal" and the "terminal code of clerk terminal" in association in the linkage database DBCB in the auxiliary storage unit 33 in response to the linkage request sent from the user terminal 200. Since there is no transmission of information from the user terminal 200 to the clerk terminal 300, it is more reliable to protect customer's information from a store clerk operating the clerk terminal 300.

A method for obtaining a terminal code of a terminal to be linked at the user terminal 200 or clerk terminal 300 may be a method that does not use bar codes, such as wireless communication, for example. Alternatively, one terminal may have the other terminal obtain a code for linkage that is different from the terminal code, and each terminal may notify the mobile controller 3 of its own terminal code along with the code for linkage. That is, as long as a pair of terminal codes of the user terminal 200 and the clerk terminal 300 to be linked can be reported to the mobile controller 3 in some way, the method may be discretionary.

As part of the operations involved in registration, an operation for discount or saving on a purchased product may be performed at the user terminal 200. That operation is, for example, to have a bar code printed on a discount coupon scanned by the user terminal 200. In this case, the processor 302 at the clerk terminal 300 may accept the operation for discount or saving on a purchased product during linkage with the user terminal 200 and make a request in response to the operation to the mobile controller 3.

As part of the operations involved in registration, an operation for discount or saving on a transaction may be performed at the user terminal 200. That operation is, for example, an operation for authentication that a customer operating the user terminal 200 is a person entitled to receive a discount or saving service for the transaction. One example of such operation is to have the user terminal 200 read a card that certifies that the customer is entitled to receive a discount or saving service, such as a membership card or childcare support card. And in this case, the processor 302 at the clerk terminal 300 may accept the operation for discount or saving on the transaction during the linkage with the user terminal 200 and make a request in response to the operation to the mobile controller 3.

At the clerk terminal 300, the processor 302 may accept an operation related to at least one of quantity change, purchased product deletion, or purchased product cancellation during the linkage with the user terminal 200 and make a request in response to the operation to the mobile controller 3.

In the above embodiment, the functions as the first registration unit and the second registration unit are realized by the computer with the processor 21 as the central part and the processor 31 as the central part. That is, the above embodiment is an example of realizing a transaction processing device by a combination of the virtual POS server 2 and the mobile controller 3. However, the virtual POS server 2 may directly receive requests from the user terminal 200 and the clerk terminal 300, and the mobile controller 3 may not be provided. In this case, the functions as the first and second registration units will be realized by the computer with the processor 21 as the central part. The virtual POS server 2 would then correspond to the transaction processing device.

In a case where the user terminal 200 is lent to a customer at a store as a tablet terminal, etc. attached to a shopping cart, various data included in check-in data may be stored in the user terminal 200 in advance, thereby omitting reading of a two-dimensional code TCI for check-in. Checkout may also be replaced with another process such as a process performed by an existing cart POS system, for example.

Each function realized by the processors 11, 21, 31, 201, and 302 through information processing can be partially or fully realized by hardware that executes information processing not based on a program, such as a logic circuit. Each of the above functions can also be realized by combining software control with hardware such as the logic circuit described above.

The program according to the present embodiment may be provided in a state of being stored in an electronic device or of not being stored in an electronic device. In the latter case, the program may be provided over a network or provided in a state of being recorded on a recording medium. The recording medium may be a non-transitory tangible medium. The recording medium may be a computer-readable medium. The recording medium can be any medium capable of storing a program and readable by a computer, such as a CD-ROM or a memory card, regardless of its form.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A transaction processing system comprising:
an enclosed store region including an entrance having a check-in code symbol presented thereat and an exit having a check-out code symbol presented thereat;
a customer terminal comprising:
a camera; and
a first processor configured to:
transmit a check-in request including a customer terminal identifier of the customer terminal upon determining that a code symbol captured by the camera is the check-in code symbol; and
transmit a check-out request including the customer terminal identifier upon determining that the code symbol captured by the camera is the check-out code symbol;
a store terminal; and
a mobile controller comprising:
an communication interface; and
a second processor configured to:
in response to the check-in request, perform a check-in process to generate a transaction-specific data record in association with the customer terminal identifier;
in response to a first product code from the customer terminal in a state in which the customer terminal is checked in, perform a first product registration process of registering a first transaction content related to a first product identified by the first product code in association with the transaction-specific data record;

in response to a link request from the customer terminal or the store terminal in the state in which the customer terminal is checked in, perform a link process of generating a linkage data record in which the customer terminal identifier is associated with a store terminal identifier of the store terminal;

in response to a second product code from the store terminal in a state in which the customer terminal is checked in and the customer terminal identifier is associated with the store terminal identifier, perform a second product registration process of registering a second transaction content related to a second product identified by the second product code in association with the transaction-specific data record; and in response to the check-out request, perform a check-out process to clear the transaction-specific data record.

2. The transaction processing system according to claim 1, wherein the second processor is further configured to determine whether a terminal identifier included in the link request is a store terminal identifier or a customer terminal identifier, and perform the link process only upon determining that the terminal identifier included in the link request is a store terminal identifier.

3. The transaction processing system according to claim 1, wherein the customer terminal further comprises a graphical user interface including an operational object, the first processor is further configured to cause a code symbol representing the customer terminal identifier and terminal linkage to be displayed on the graphical user interface, upon a user operation of the operational object, and the store terminal is configured to transmit the link request, which includes the customer terminal identifier and the store terminal identifier upon scanning of the code symbol on the graphical user interface of the customer terminal.

4. The transaction processing system according to claim 1, wherein the store terminal is configured to cause a code symbol representing the store terminal identifier and terminal linkage to be displayed on a graphical user interface thereof, and the first processor is configured to transmit the link request, which includes the customer terminal identifier and the store terminal identifier upon scanning of the code symbol on the graphical user interface of the store terminal by the camera.

5. The transaction processing system according to claim 1, wherein the second processor is further configured to:

in response to a release request from the store terminal, clear the linkage data record to dissociate the customer terminal identifier from the store terminal identifier; and in response to a third product code from the customer terminal in a state in which the customer terminal is checked in and the customer terminal identifier is dissociated from the store terminal identifier, perform a third product registration process of registering a third transaction content related to a third product identified by the third product code in association with the transaction-specific data record.

6. The transaction processing system according to claim 1, wherein the second processor is configured to, during the check-in process, generate a transaction identifier and associate the generated transaction identifier with the transaction-specific data record.

7. The transaction processing system according to claim 6, the transaction identifier and the customer terminal identifier are associated with each other in the transaction-specific data record.

*    *    *    *    *